United States Patent
Butler

[19]

[11] Patent Number: 5,921,231
[45] Date of Patent: Jul. 13, 1999

[54] SOLDERING TOOLS

[75] Inventor: Derek Butler, Carlow, Ireland

[73] Assignee: BS Technology Limited, Carlow, Ireland

[21] Appl. No.: 08/571,835

[22] PCT Filed: Jun. 17, 1994

[86] PCT No.: PCT/IE94/00032

§ 371 Date: Jan. 25, 1996

§ 102(e) Date: Jan. 25, 1996

[87] PCT Pub. No.: WO95/00280

PCT Pub. Date: Jan. 5, 1995

[30] Foreign Application Priority Data

Jun. 25, 1993 [IE] Ireland ................................. S930480

[51] Int. Cl.[6] .................................................. F23K 3/02
[52] U.S. Cl. ......................... 126/414; 126/405; 126/406; 431/7; 431/328
[58] Field of Search ............................... 431/206, 7, 326, 431/328, 268, 344, 75; 126/403, 404, 406, 407, 408, 409, 413, 414

[56] References Cited

U.S. PATENT DOCUMENTS

| 4,119,088 | 10/1978 | Sim ......................................... 126/413 |
| 4,133,301 | 1/1979 | Fujiwara ................................... 126/413 |
| 4,502,465 | 3/1985 | Yoshinaga ................................ 431/255 |
| 4,552,124 | 11/1985 | Nakajima ................................. 126/413 |
| 4,785,793 | 11/1988 | Oglesby ................................... 126/414 |
| 4,920,952 | 5/1990 | Nakajima ................................. 126/414 |
| 5,215,076 | 6/1993 | Oglesby et al. ......................... 126/413 |
| 5,215,456 | 6/1993 | Fujiwara ...................................... 431/7 |
| 5,388,986 | 2/1995 | Khemarangsan ........................ 431/344 |

FOREIGN PATENT DOCUMENTS

| A-100060 | 2/1984 | European Pat. Off. . |
| A-464476 | 1/1992 | European Pat. Off. . |
| A-3526927 | 2/1986 | Germany . |
| 405141653 | 6/1993 | Japan ..................................... 431/268 |
| WO 93/12377 | 6/1993 | WIPO . |

*Primary Examiner*—Carl D. Price
*Attorney, Agent, or Firm*—Hazel & Thomas, P.C.

[57] ABSTRACT

A handheld soldering tool has a fuel reservoir or tank (10), a tip (1) heated in use by a catalyst assembly (2), a valve assembly (9) for controlling flow of gaseous fuel from the reservoir (10) to the catalyst assembly (2), and a piezo-electric ignition device (7) for igniting gas released from tank (10) for combustion during an initial warm-up period to bring the catalyst to its operating temperature. A spring member (19) mounted on a rocker member (17) serving to transmit an actuating force from a switch member (18) to the piezo device (7) is arranged to momentarily interrupt the flow of gas from valve assembly (9) through Venturi (16) to combustion region (15), to terminate the initial combustion period, during reverse movement of the rocker member (17) from an ignition disposition to a non-active or gas-flow disposition. The valve assembly (9) is mounted within an aluminum housing structure (21), to provide for enhanced heat transfer to gas exiting from tank (10), for accelerated evaporation of the initially liquid gas into the gaseous phase. The tip (1) is separable from the catalyst assembly (2), so that each of these components may be replaced independently.

15 Claims, 16 Drawing Sheets

SOLDERING TOOLS

BACKGROUND OF THE INVENTION

1. Field of the Invention

This invention relates to handheld heat-generating tools, such as soldering tools. The invention is especially directed to gas-powered, catalyst-heated portable soldering tools, in particular, soldering irons.

2. Description of the Related Art

A diversity of constructions of portable soldering tools are known, including U.S. Pat. No. 4,133,301, which discloses a gas-powered soldering tool having various different constructions of soldering tip. An older construction of gas-powered soldering iron is described in U.S. Pat. No. 2,807,317, in which heating is effected by gas combustion rather than by a combustion catalyst. A further flame combustion type soldering tool is disclosed in U.S. Pat. No. 4,119,088. Yet another flame-heated soldering tool is described in DE 9602, while DE 1,253,020 is also directed to a combustion-based soldering tool.

EP-A-0,118,282 and corresponding U.S. Pat. No. 4,785,793 are directed to a soldering tool having a soldering tip with a tip portion and a housing to the rear of the tip portion. A catalytic element is located in a combustion chamber of the tool and arrangements are provided for supplying fuel to the catalytic element to heat the soldering tip. A particular feature of the arrangement is that the tip is carried solely by an internal support which extends from the tip through the combustion chamber to the fuel supply portion of the structure. This internal support serves to distribute fuel to the catalytic element and to conduct heat from the combustion chamber into the soldering tip portion.

A particular feature of catalytically-heated devices is the necessity for an initial flame-heating or thermal combustion phase and the concomitant need to terminate this phase when the catalyst is sufficiently hot to sustain continuing catalytic heating. A diversity of techniques are known for addressing this problem.

In U.S. Pat. No. 4,502,465, there is described a catalyst combustion curling device in which initial heating of the catalytic element is effected by flame heating. Initial forward movement of an operator member closes off an air hole, following which ignition takes place. Flame combustion is supported while the air hole remains closed, and is terminated by a reverse movement of the operator member, which results in the air hole being opened again, this causing a greater intake of air and extinguishing the flame. Catalytic heating then continues.

In U.S. Pat. No. 4,920,952 and corresponding GB 2,208,540A, a similar type of apparatus is described in which a gas/air mixture is piezoelectrically ignited to heat a combustion catalyst by an ignited flame. Subsequent flameless catalytic heating continues following flame extinction, which is effected by an arrangement enabling the gas/air ratio within the unit to be varied. In this way, a ratio suitable for ignition may be initially effected, then transformed into a ratio which brings about flame extinction, and finally the gas/air ratio may be adjusted for continuing catalytic combustion.

GB 2,156,964A describes a soldering iron using liquefied gas as a heat source, in which the gas from the liquefied gas tank is mixed with air and then directed to a combustion chamber for complete and flameless catalytic combustion. A shutter mechanism opens ignition ports at the inlet of the combustion chamber upon ignition of the mixture, for initial flame heating of the catalyst. These ports are closed after ignition of the gas mixture.

U.S. Pat. No. 4,552,124 is another example of a flameless combustion heating unit in which catalytic action is initially engendered by flame heating, and a shutter mechanism closes ports after completion of the ignition phase.

Disadvantages of arrangements such as those noted above in which one or more slideable members close off one or more ports or air holes is that for flame ignition to take place, a correct air to gas mixture ratio must be achieved. The achievement of such a correct ratio requires regulation of gas flow and Venturi or orifice size. Flame extinction involves displacement of a slideable member to usually close the ports or air holes, thereby upsetting the air/gas mixture required to support flame combustion and resulting in flame extinction. Such arrangements may be accompanied by an inefficient mixture of air and gas, this being consumed by the catalyst.

U.S. Pat. No. 5,215,456 is directed to an alternative manner of flame extinction from those previously described, in this instance by providing an actuating mechanism in the form of a bimetallic strip to bring a diffusion member into and away from the entrance of the combustion chamber. As described in this document, the diffusion member is initially placed in the flow of gas to establish flame combustion, and according as the bimetallic strip bearing the diffusion member heats up, the diffuser is then displaced out of the gas flow and flame combustion is terminated. Disadvantages of this arrangement are the relatively slow speed of operation of the bimetallic strip and the likelihood of its rusting or otherwise corroding with the passage of time. According as corrosion develops, which is likely because of the adverse conditions under which it operates, the bimetallic strip will cease to function. A further disadvantage is that when the unit is switched off, the bimetallic strip will take some time to cool and therefore a certain amount of time will pass before the diffuser is restored to the initial flame combustion position. While the strip is moving back to this initial or rest position, the unit will be unusable and must be set aside until such time as it is cooled down.

A non-catalytic unit is described in U.S. Pat. No. 4,815,441, in which two nozzles are provided for quick initial heating. A bimetallic strip terminates the heating action of one of the two nozzles, when the level of heat is sufficient, with the flame from the second nozzle continuing to heat the active portion of the unit. The flame is accommodated within a gauze enclosure, in the manner of a Davy lamp, thereby preventing ignition of combustible material to the exterior of the gauze.

A further necessity in catalytically heated devices is the need to maintain the evaporative process in the gas release valve, where the liquid gas is vaporised. In U.S. Pat. No. 5,215,076, as in EP-A-0,118,282 and corresponding U.S. Pat. No. 4,785,793, already discussed above, the possibility again exists of heat transfer through a heat transfer member from the combustion chamber of the unit to the gas discharge nozzle. Such an arrangement serves to maintain evaporation once combustion and catalytic action have been established, but does not assist in establishing initial evaporation when attempting to start up a unit from a cold condition.

In U.S. Pat. No. 4,785,793, a finned retaining collet is provided, but this serves to dissipate heat away from the plastic housing of the structure, rather than conduct heat to the nozzle area for gas evaporation.

SUMMARY OF THE INVENTION

The present invention is directed to further novel constructions of heat-generating tool, such as a soldering tool, in which heating of the tip is effected by catalytic action. It is one objective of the invention to provide an improved manner of flame extinction in heat-generating tools such as soldering tools. It is a particular objective of the invention to provide for flame extinction in a heat-generating tool by mechanical interruption of a jet of gaseous fuel supporting the flame during the combustion phase. It is a still further objective of the present invention to provide an improved manner of transition of the initially liquid gas to the vapour or gaseous phase in tools of the kind to which the invention is directed.

According therefore to a first aspect of the invention, there is provided a handheld heat-generating tool comprising:

(a) a fuel reservoir, (b) a heat evolution and application section having a forward region for application of heat generated by the tool and a rearward region within which heat generation takes place by means of fuel interaction with a catalytic element, (c) means for controlling flow of fuel from the fuel reservoir to the heat evolution and application section, and (d) means for igniting fuel for initial flame heating of the catalytic element, wherein means are provided for termination of the initial flame heating by momentary mechanical interruption of flow of fuel from the fuel reservoir to the heat evolution and application section.

In a handheld heat-generating tool according to the invention wherein the means for controlling the flow of fuel provides a stream of gas which is released from a nozzle for flow to the heat evolution and application section of the tool, said means for termination of the initial flame heating is suitably located for momentary mechanical interruption of said stream of gas released from said nozzle. Said means for termination of the initial flame heating then preferably comprises a flame extinction member arranged to traverse said stream of gas released from said nozzle for said momentary mechanical interruption of flow of fuel from the fuel reservoir to the heat evolution and application section.

The handheld heat-generating tool according to the invention preferably also comprises a manually-operable switch member displaceable between at least two positions, said traverse of said stream of fuel by said flame extinction member being then effected by displacement of said switch member between said at least two positions. In a handheld heat-generating tool according to the invention comprising a duct for flow of said stream of gas released from said nozzle to the heat evolution and application section of the tool, the entry to the duct is suitably separated from the nozzle by a region through which said traverse of the flame extinction member takes place.

In a particular construction of handheld heat-generating tool according to the invention, said flame extinction member may be defined by a free end region of a resilient spring portion mounted for displacement between a first stressed configuration and a second stressed configuration by displacement of said switch member between said at least two positions, said traverse of said stream of fuel by said flame extinction member being then effected by displacement of said resilient spring portion between said first and second stressed configurations.

The handheld heat-generating tool according to the invention may comprise a switch housing portion, said switch member being slideably mounted in said switch housing portion and cooperating with a rocker member mounted within the switch housing portion for activation of a piezo-electric device. Said resilient spring portion is then suitably mounted on the rocker member and said displacement of said resilient spring portion between said first and second stressed configurations is effected by pivoting movement of said rocker member, said pivoting movement being in turn effected by sliding displacement of said switch member.

The handheld heat-generating tool of the invention in this first aspect may comprise a manually-operated switch member displaceable between an off position and an ignition position through an intermediate fuel-flow position, and the fuel igniting means may comprise a piezo-electric device activated by displacement of the switch member into the ignition position, the switch member cooperating with a flame extinction member arranged to traverse a stream of fuel flowing from the fuel reservoir to the heat evolution and application section during displacement of the switch member from the ignition position to the fuel-flow position to define the means for termination of initial flame heating.

In a preferred arrangement, the handheld heat-generating tool according to the invention in its first aspect also comprises a switch housing portion, and the switch member is slideably mounted in the switch housing portion and cooperates with a rocker member mounted within the switch housing portion for activation of the piezo-electric device, the flame extinction member being defined by a resilient spring portion mounted on the rocker member and having a free end region shaped to effect the momentary interruption of the stream of fuel for termination of initial flame heating. The means for controlling the flow of fuel may be arranged to provide a stream of gas which is released from a nozzle for flow through a duct to the heat evolution and application section of the tool, the entry to the duct being separated from the nozzle by an open space through which traverse of the flame extinction member takes place.

In any variant of handheld heat-generating tool according to the first aspect of the invention, the means for controlling flow of fuel from the fuel reservoir to the heat evolution and application section may comprise a valve assembly accommodated within a valve housing structure formed from a heat conductive material.

This latter feature also independently forms the subject of a second aspect of the invention, according to which there is provided a handheld heat-generating tool comprising:

(a) a fuel reservoir, (b) a heat evolution and application section having a forward region for application of heat generated by the tool and a rearward region within which heat generation takes place by means of fuel interaction with a catalytic element, (c) means for controlling flow of fuel from the fuel reservoir to the heat evolution and application section, and (d) means for igniting fuel for initial flame heating of the catalytic element, wherein the means for controlling flow of fuel from the fuel reservoir to the heat evolution and application section comprises a valve assembly accommodated within a valve housing structure formed from a heat conductive material.

In a particular embodiment, the handheld heat-generating tool according to either the first or second aspects of the invention comprises a manually-operated switch member displaceable between an off position and an ignition position through an intermediate fuel-flow position, and the valve assembly comprises a flow control member displaceable between a closed position and an open position, a mechanism linking the switch member and the flow control member providing for the flow control member to be closed when the switch member is in the off position and for the flow control member to be open when the switch member is in the fuel-flow or ignition positions.

Preferably, the handheld heat-generating tool further comprises a switch housing portion, the switch member being slideably mounted in the switch housing portion and a camming portion of the switch member cooperating with a pivotable link member mounted within the switch housing portion to define the mechanism linking the switch member and the flow control member. The valve assembly may in addition comprise a flow regulation feature for varying the rate of release of fuel from the reservoir when the flow control member is open.

This flow regulation feature comprises, in a favoured arrangement, a compressible fuel-permeable assembly accommodated within the valve housing structure and manually operable adjustment means for varying the degree of compression of the fuel-permeable assembly. In particular, the fuel-permeable assembly may comprise a spongiform arrangement, while the adjustment means may comprise a sectorally displaceable manually-engageable member linked to a screw-thread type structure for translating rotational displacement of the manually-engageable member into axial compressive action on the spongiform arrangement.

In an especially favoured construction of the invention, the valve housing structure provided in particular by the second aspect of the invention is formed from aluminium.

According to a further feature of the invention, applicable to the handheld heat-generating tool according to the invention in both its first and second aspects, the forward region of the heat evolution and application section comprises a tip portion, the tip portion being an independent component separable from the remainder of the tool.

This latter feature may also form the subject of a third aspect of the invention under which there is provided a handheld heat-generating tool comprising:

(a) a fuel reservoir,
(b) a heat evolution and application section having a forward region for application of heat generated by the tool and a rearward region within which heat generation takes place by means of fuel interaction with a catalytic element,
(c) means for controlling flow of fuel from the fuel reservoir to the heat evolution and application section, and
(d) means for igniting fuel for initial flame heating of the catalytic element, wherein the forward region of the heat evolution and application section comprises a tip portion, the tip portion being an independent component separable from the remainder of the tool.

The rearward region of the heat evolution and application section within which heat generation takes place by means of fuel interaction with a catalytic element suitably comprises a first chamber for accommodating the catalytic element and a second, flame combustion chamber to the rear of said first chamber. In a particular arrangement, the first chamber for accommodating the catalytic element is defined within a counter-bore region of the tip for accommodating a catalyst assembly, to provide for independent interchange or replacement of tip and catalytic element.

In a particular construction of the invention, said tip portion may be a soldering member, an alternative embodiment providing for said tip portion to be a hot-blow member.

In any arrangement of handheld heat-generating tool according to the invention, the unit may comprise a switch housing portion and a valve housing structure interconnecting the switch housing portion to the fuel reservoir, the heat evolution and application section comprising a tip portion and the rearward region of the heat evolution and application section within which heat generation takes place by means of fuel interaction with a catalytic element comprising a first chamber for accommodating the catalytic element and a second, flame combustion chamber to the rear of said first chamber, said tip, first chamber and second chamber being detachably associated with said switch housing portion.

In this construction of the invention, the valve housing structure and the fuel reservoir may be arranged arranged to define a generally elongate structure and a cap provided for occluding the exterior of the heat evolution and application section, the cap engaging a switch member of the device when in its occluding position to maintain the switch member in an off position.

In any construction of handheld heat-generating tool according to the invention, the switch member may be shaped to provide an externally-directed flat face to enable the tool to be laid on a-flat surface in a stable disposition substantially resistant to inadvertent lateral displacement.

The invention also extends to a handheld heat-generating tool substantially as described herein with reference to and as shown in any one or more of the accompanying drawings.

BRIEF DESCRIPTION OF THE DRAWINGS

The invention will now be described in more detail, having regard to the accompanying drawings, in which.

DESCRIPTION OF THE PREFERRED EMBODIMENTS

Figure 1:
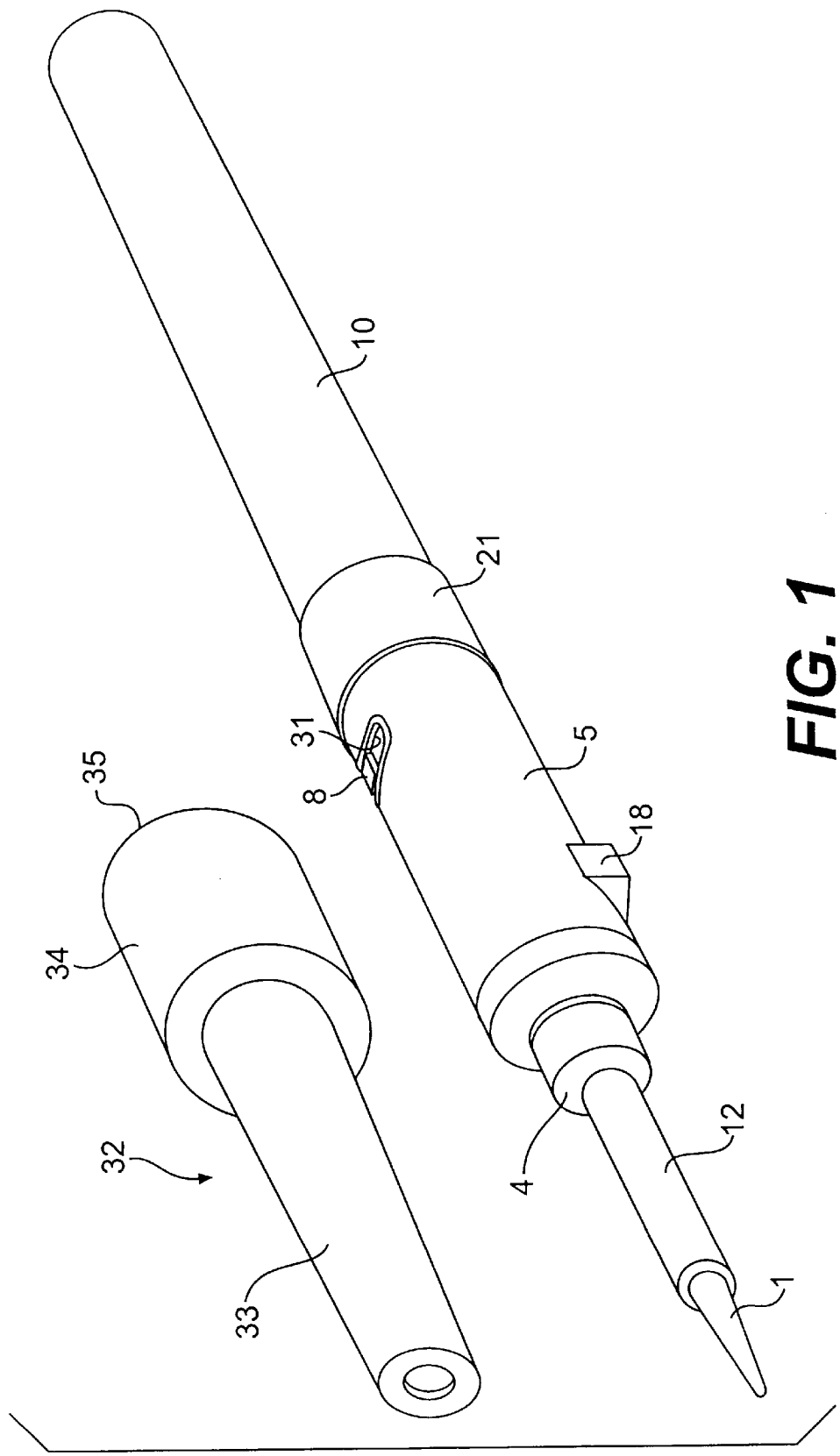
FIG. 1 is an external pictorial view of a unit according to the invention in a first embodiment.

Referring to FIG. 1 of the drawings, which is a pictorial external view of the unit of the invention, a gas-powered, catalytic, hand-held soldering tool according to the invention has a tip or element 1, which is heated in use of the tool by reaction of gas released from a reservoir or tank 10 with the catalyst material of a catalyst assembly housed within an outer tip tube 12. Tube 12 and the catalyst assembly within it are held in position on a substantially cylindrical main or switch housing portion 5 of the device by means of a screw-threaded collet 4. The housing 5 consists of an axially-divided two-part structure for ease of assembly and contains various operating features of the tool, subsequently described. Housing 5 has an external finish consisting of a longitudinally ribbed or serrated or knurled surface, for ease of holding in use of the invention. Switch-on of the device and control of gas flow is effected by means of a single sliding thumb switch 18, readily operated by the user when the device as a whole is held in the hand. Switch 18 is displaceable between a forward position in which ignition of gas is effected for initial heating, and a rearward disposition in which gas flow is fully cut off. In an intermediate or mid position of switch 18, continuous gas flow is enabled for the required catalytic heating of the tip 1. Switch 18 fulfils purely an on-off function in regard to gas flow. The actual level of flow of gas to the catalytic element within tube 12, in other words the rate of gas release from the storage tank 10 of the unit, is regulated by an adjuster assembly, which has a portion 8 accessible for engagement by the finger and laterally displaceable in a sectoral manner within a part-circumferential slot 31 in the exterior surface or wall of housing 5. To the rear of housing 5, the device is provided with an adjuster or valve assembly housing portion 21, suitably formed from aluminium, which also serves as a mounting portion for the gas tank 10. When the device is not in use, the active end, namely the tip 1 and the catalytic assembly within tube 12, is covered by a cap 32, the tapering leading end 33 of which fits over the tip 1 and tube 12, while the larger diameter rear portion 34 engages in a gripping manner over the front end of housing 5. When the cap is in position, its rear edge 35 pushes against the sliding switch 18 to force the switch into the gas-off disposition during placement of the cap on the tool and to retain it in the off configuration while the unit is capped. Thus with the cap in position on the tool, the entire device takes up a quiescent or inactive status, which provides an advantageous safety aspect of the invention.

In use of the invention, in summary, gas contained in liquid form in the storage tank or chamber 10 of the soldering tool of the invention is released in gaseous form through an evaporative valve mechanism incorporated in the aluminium support structure 21 for the tank 10 and housing 5 by means of the manually-operated switch 18. Gas flow takes place to a combustion chamber of the device, located within tube 12, which is provided with a piezo-electric ignition device for igniting the gas at start-up. Extinction of the flame after an appropriate initial warm-up period is achieved by a mechanism to be described, which is a particular feature of the invention, the gas flow being then maintained without combustion for continued heating of the catalyst during use of the soldering tool, at a rate determined by adjustment of sectoral adjuster or gas flow regulator 8.

Figure 2:
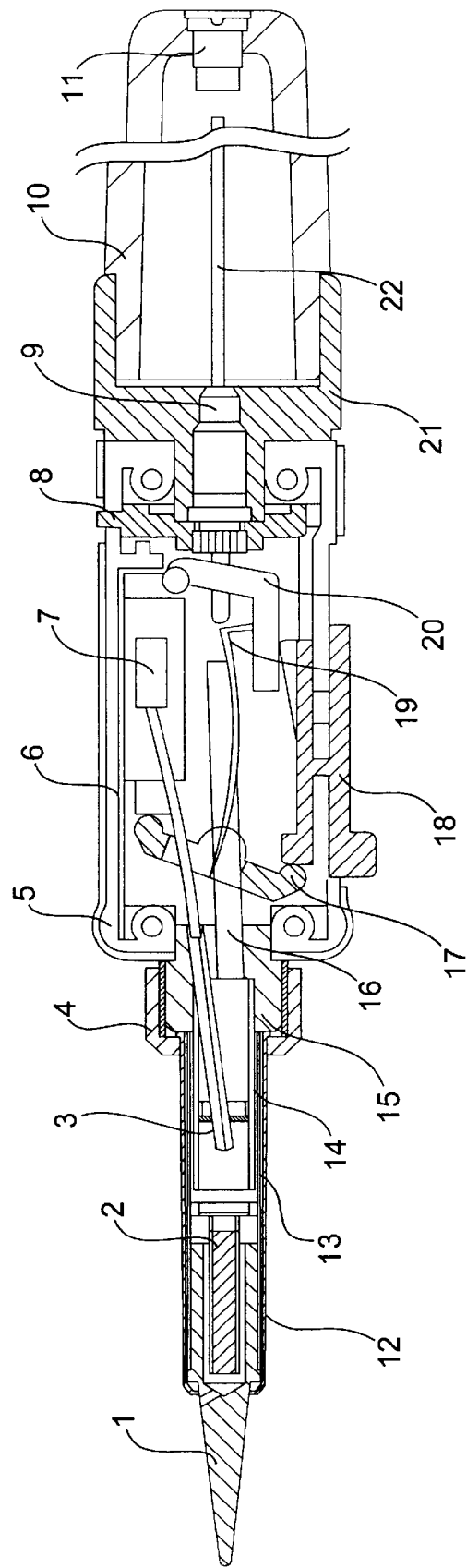
FIG. 2 is a longitudinal cross-section of the tool of the invention in its first embodiment.

Working forwards therefore from the rear of the device and referring now also to the longitudinal sectional view of FIG. 2, a gas tank or chamber 10 is provided to hold liquid butane gas, which is the fuel for the soldering tool. Tank 10 is suitably formed from an opaque but translucent plastics material of dark coloration, suitably black, which appears opaque, but which is sufficiently translucent to allow the level of the gas within the tank to be checked by holding the unit against the light. The chamber 10 is rechargeable as required through a filling valve 11, and, because of the translucent nature of the material of the tank 10, the quantity of gas remaining within the tank or chamber 10 may be checked at any time. Suitably a matt finish is applied to the tank 10, which forms an integral component of the unit or structure. In an alternative arrangement, the gas tank 10 may be of clear see-through construction, so that the liquefied gas within it is actually visible to the user at all times. The gas tank 10 is not interchangeable and further supplies of gas are provided by charging the tank through the filling valve 11 at the axial end of the tank 10 remote from the remainder of the soldering tool.

The other or forward end of the tank is received in the aluminium housing 21, which also accommodates a valve structure to be described for release of the liquefied butane gas from the tank 10 into the operating portions of the tool, and in addition serves as a support for the forward end structures of the tool. Aluminium is preferred for this portion 21 of the structure, as compared with a plastics moulding, because of its heat-conductive capabilities. A modest degree of warming of the liquid butane gas is necessary in order that it may evaporate from the liquid phase into the gaseous phase, which is required for proper functioning of the tool of the invention. The heat-conductive capabilities of aluminium enable hand heat originating with the user of the invention to assist this evaporative activity. The aluminium of housing 21 may optionally be anodised, depending on the nature of external finish required, and this portion of the unit is preferably also black in colour, for advantageous absorption of heat. Thus, within the internal evaporation region and valve structure of this portion 21 of the unit, to be described in greater detail with reference to subsequent drawings, butane is fed in by a wick 22 to a gas valve assembly 9. The wick extends longitudinally along the axial length or extent of tank 10, substantially coaxially with the generally cylindrical, slightly conical tank, which tapers outwardly or in an enlarging cross-sectional manner from fill valve 10 towards release valve assembly 9. The gas then undergoes an evaporative process and is released to the active end of the device.

Further gas flow features of the invention are contained within the main or switch housing structure 5, which may also be defined as a tubular gripping portion of the device, along with the ignition components of the unit, in which connection reference may now also be made to FIGS. 4 to 7 and 8. Gas exits from the flow assembly 9 through a nozzle tube 41 (FIGS. 4 to 7 and 8) under the control of pivotally mounted lifting lever 20, which functions in a manner to be described. Effectively, forward pivoting of lever 20 against the bias of a spring (not shown in these Figures), which acts to urge the lever 20 in a rearward direction, enables gas to flow from nozzle tube 41. Gas leaving the nozzle of the tube 41 next enters into an inlet end 42 of Venturi tube 16. Air is entrained with the gas as it enters the Venturi tube. The spacing between the exit nozzle of tube 41 and the inlet end 42 of the Venturi is selected, in conjunction with the profile or shape or configuration of the Venturi, to provide a requisite level of performance, although this does not entail high precision assembly, and, in this region of the device, as in other aspects of the invention, relatively low tolerances may apply. At the exit end 43 of the Venturi 16, the gas enters a combustion chamber portion of the device, to be described.

The pivoting movement of lever 20 which takes place about a substantially transverse axis 45 offset laterally from the longitudinal axis of the unit as a whole, is controlled by a camming portion 51 of the user on-off switch 18. This camming portion has a sloping surface, which rises as shown in the sectional view of FIG. 2 and in greater detail in FIGS. 4 to 7 and 8, in a radially inward direction within the housing 5 relative to the main sliding body of the switch 18, to slope upwards in a direction away from the tip of the unit. The effect of this arrangement is to urge lever 20 in a forwardly pivoting direction towards the tip of the apparatus by engagement of the camming portion 51 against a heel or cranked limb or portion 52 of lever 20 during forward or switch-on movement of switch 18, against the restoring or counterclockwise action of the bias spring for lever 20, which tends to urge lever 20 to a gas-off condition.

At the forward or leading end of housing or chamber region 5, opposite to the gas inlet region, an igniter rocker switch or member 17 is mounted for pivotal displacement, again about an axis 67 transverse to the longitudinal axis of the unit and defined by two laterally projecting axle or spigot portions of the rocker 17. The axis of pivoting 67 is in the case of the rocker switch substantially diametral, as compared with the offset location of the axis 45 of pivoting for the lever 20. Rocker switch 17 is provided with two camming or lug portions 61 and 62, one of which (61) is engaged by a co-operating camming or lug portion 55 located at the forward or leading end of switch 18, i.e. the opposite end of the sliding switch member from the camming portion 51 which co-operates with lever 20. The second lug 62 at the opposite end of the pivotally mounted rocker switch is arranged to engage against the displaceable portion 71 of a piezo-electric igniter assembly 7. Thus forward urging of the on/off switch 18 into a foremost disposition effects an igniting operation of the piezo-electric unit 7, by engagement of switch lug portion 55 against the co-operating camming portion 61 of rocker member 17, so that the rocker member is pivoted about axis 67 and its second lug or camming portion 62 depresses the displaceable portion 71 of the igniter assembly 7 to effect the requisite spark action.

The on/off switch unit 18 is a sliding assembly mounted for forward and rearward displacement in an axial direction within a longitudinal slot in the wall of the housing 5. The switch has internal and external sliding portions 56 and 57 respectively, linked by a bridge portion 58 extending through the housing slot. These details are shown in the enlarged views of FIGS. 4 to 7. The camming portions 51 and 55 are located at opposite axial ends of the internal sliding switch portion 56.

At the leading end of its external sliding portion 57, the switch 18 terminates in a thumb-engagement portion 59. By appropriately profiling portion 59 to have a flat outer face, the soldering iron may be placed during use on a table or other level surface with this flat portion engaged on the surface, so that it will not roll sideways, while the hot tip remains raised above the surface and cannot contact and damage the surface. Thus the thumb-grip portion 59 also essentially defines a transverse rib or foot portion. This arrangement represents an important safety feature of the invention.

For ease of assembly, the housing 5 is suitably formed from two axially-divided half-portions, which may be substantially mirror images of one another, thereby facilitating the insertion and placement of the internal moving parts, lever, rocker, switch portions, etc. The housing, switch components, rocker, etc., are preferably also of a suitable plastics material, e.g. nylon.

Figure 3:
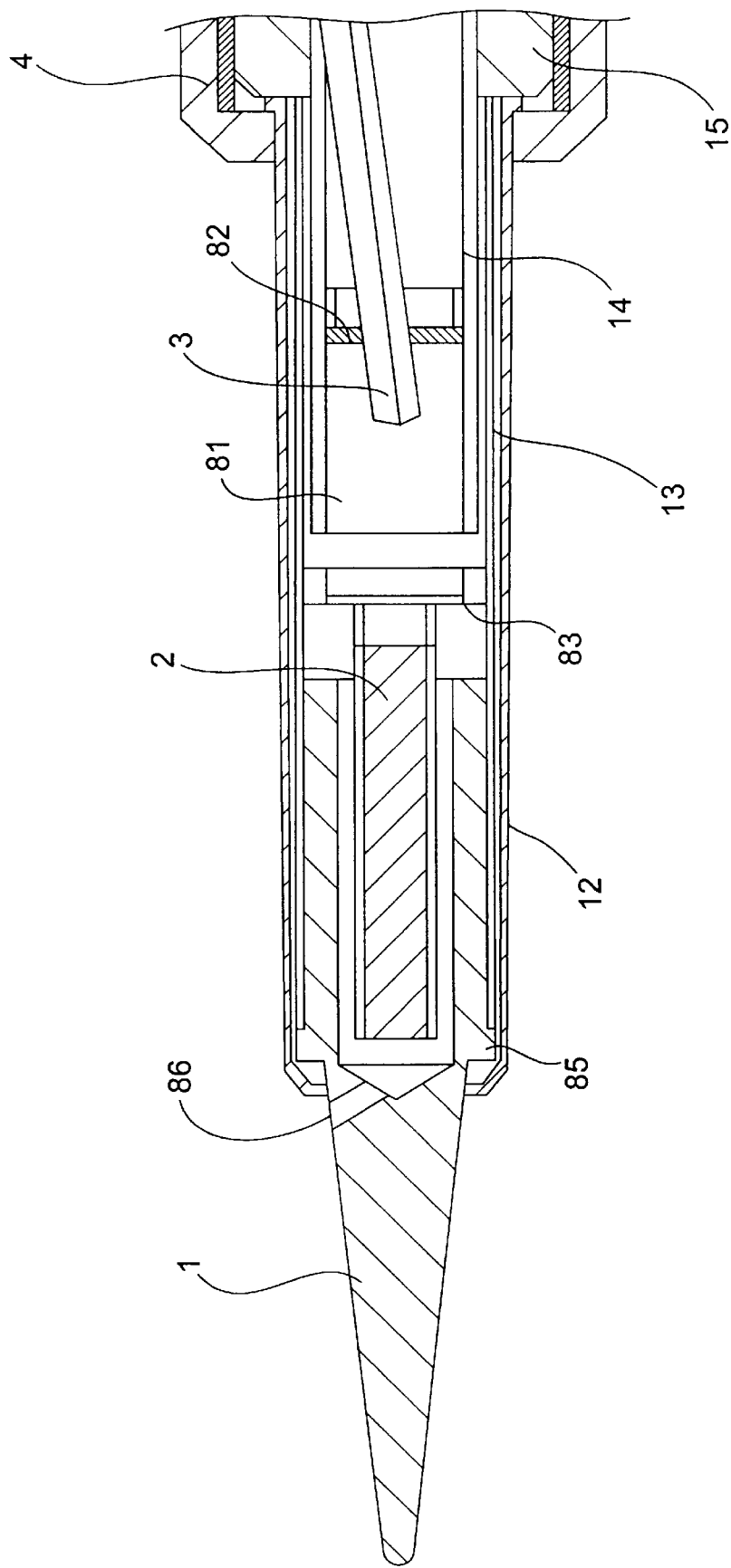
FIG. 3 is a longitudinal sectional enlargement of the tip region of the tool of FIGS. 1 and 2.

Forward of the housing 5, the device terminates in the combustion chamber and tip portion, also shown in greater detail in the enlarged representation of FIG. 3. The combustion chamber and tip portions of the device are mounted on the housing by means of support portion 15, which extends from the forward end of the housing 5 and is provided with apertures for passage of the Venturi tube 16 and an electrode 75 leading from the piezo-electric igniter to the combustion chamber region 81. The combustion chamber 81 is defined within stainless steel igniter tube 14, within which the igniter assembly or electrode tip 3 is suitably supported by an apertured or perforated collar structure 82. Igniter tube 14 extends from and is held within the igniter housing extension 15. The tip 1 of the tool and the catalyst 2 accommodated within a counter-bored or hollow portion of the tip are held in position on the structure portion 15 by means of a sheathing or gripping outer tube 12, which is inwardly flanged at its forward end, so as to retainingly engage a circumferential lip 85 on the tip 1, and outwardly flanged at its rear end, so as to be in turn engaged by the securing collet 4 at this rearward end, the collet being screwed on to the housing extension 15 to hold the tip and combustion chamber assembly securely in place. Within this outer sheathing or sleeving tube 12, a replaceable catalyst assembly is defined by an elongate inner element tube 13, within which the catalyst material 2 is mounted by means of a support 83. Tube 13 extends over the majority of the length of the gripping tube or sheath 12, so that its rearward end slides axially into the annular space between the combustion chamber wall defined by ignition tube 14 and the outer sheath 12. The catalyst material itself is mounted on the support 83 of the assembly, and extends axially in a forwards direction into and within the counter-bore of the tip or element 1 of the tool. The support 83 is in the form of a perforated disc or collar structure to facilitate gas flow to both the inside and outside of the catalyst material. An electrically conductive contact strip 6 runs from the aluminium igniter housing 15 to the rear of the piezo unit 7, to provide a return path for current sparking over from electrode 3 to tube 14 during ignition.

At the tip end of the device, the assembly 2 comprising the catalyst and the tip 1 itself are, in the unit of the invention, separable and separate components. The tip 1 suitably consists of iron-plated copper, suitably formed by sintering to provide for long or extended tip life, and has an exit hole 86 for outflow of exhaust gas. The separation of the tip 1 from the element assembly Z provides for better life and better economy in the system, as tips tend to wear out more quickly than catalyst and may require replacement at more frequent intervals. The facility for independent replacement of tip or catalyst fully decouples the life of these components from one another so that each only needs replaced when required by its own condition or deterioration, and premature replacement occasioned by the condition or deterioration of the other is substantially avoided. Alternative end attachments may also be provided, such as a hot-blow device, in which a small stainless steel tube replaces the heating element to direct hot gas to a location of use, for heat sealing or the like, or for the removal of solder. The continued operation of the catalyst provides hot gas at up to 400° Centigrade, which is of advantage for desoldering, in that there is no oxidisation, because of the absence of oxygen from the heating gas.

Operation of the device takes place therefore, in summary, as follows. During start-up of the unit, initial forward movement of the switch 18 releases gas for flow through the Venturi into the combustion chamber 81 and then operates the piezo-electric igniter. The electrode 3 in the centre of the stainless steel tube 14 defining the combustion region 81 serves to ignite the gas at this stage, by sparkover to tube 14. A single ignition operation is sufficient to trigger operation of the device, as the gas mixture in the chamber is suitable for immediate combustion in the presence of the spark. However, in order to then initiate catalytic operation of the device, it is essential that combustion be terminated as soon as the temperature of the catalyst has risen to a level sufficient for continued catalytic action to take place without the presence of a flame.

Figure 4:
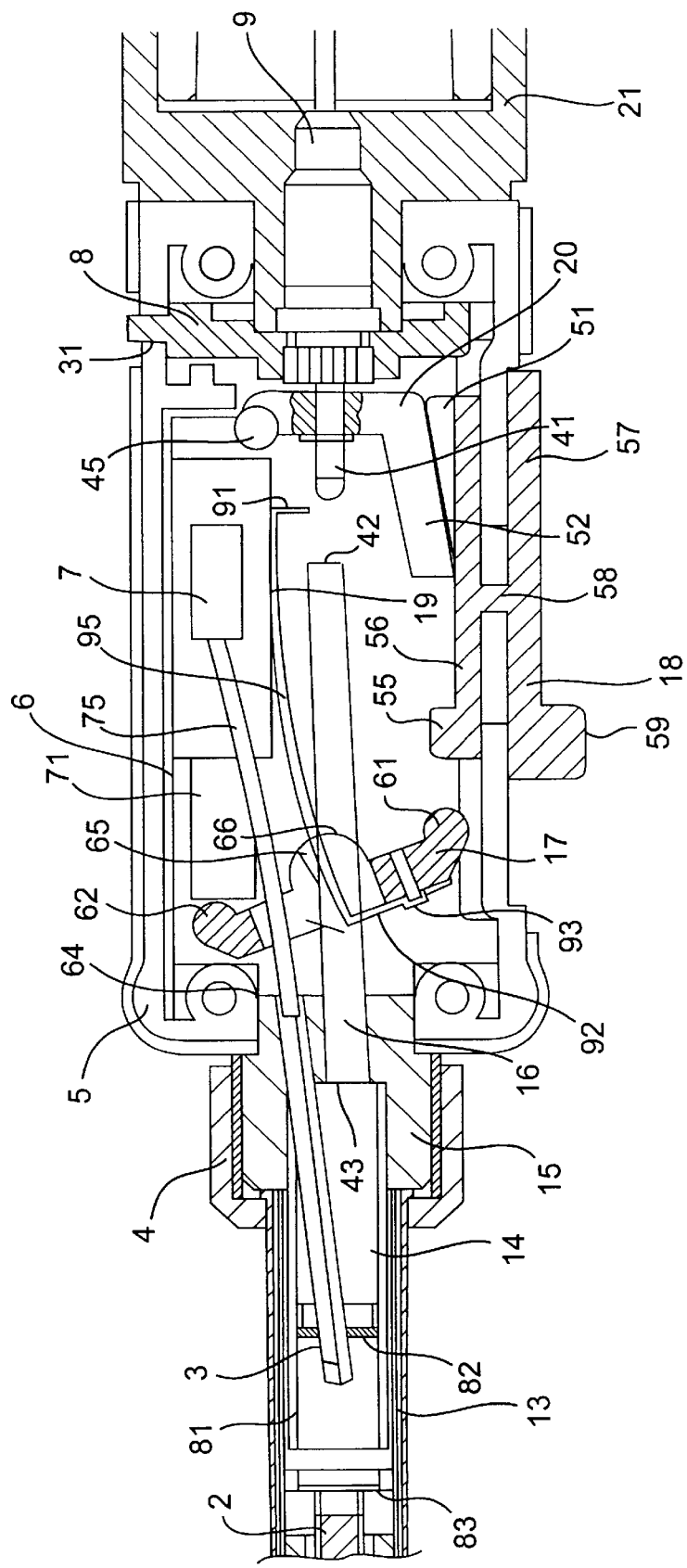
FIG. 4 is a longitudinal cross sectional enlargement of the gas flow and ignition switch region of the device of FIGS. 1 and 2, in the inactive or "off" disposition of the switch, FIG. 5 corresponds to FIG. 4, but with the operating switch in the "gas-on" position, prior to ignition, to which the switch also reverts subsequent to ignition, FIG. 6 again corresponds to FIG. 4, but in this instance with the operating switch in the disposition which it occupies immediately before ignition, at the commencement of igniting displacement of the switch, FIG. 7 yet again corresponds to FIG. 4, but in this instance showing the switch in its ignition disposition.

An important aspect of the invention is therefore the manner in which flame extinction is achieved, and this will now be described, having regard to FIGS. 4 to 7, together with the pictorial representation of FIG. 8, which are illustrative of successive operating steps in start-up of the unit of the invention. Referring therefore initially to FIG. 4, in addition to the features already discussed in relation to FIGS. 2 and 3, the housing region 5 of the device also contains a flame-off or extinction spring 19, mounted on the rocker member 17, so that during rocking movement of the rocker switch 17, a flame extinction tip 91 of the spring 19 transits through or traverses the stream of gas exiting from the nozzle tube 41, to momentarily interrupt the flow of gas. This momentary break in gas flow extinguishes the flame, in the combustion region, at the end of the initial combustion or warm-up period, and takes place during reverse movement of the rocker from an ignition configuration to a gas flow or non-active disposition.

Figure 8:
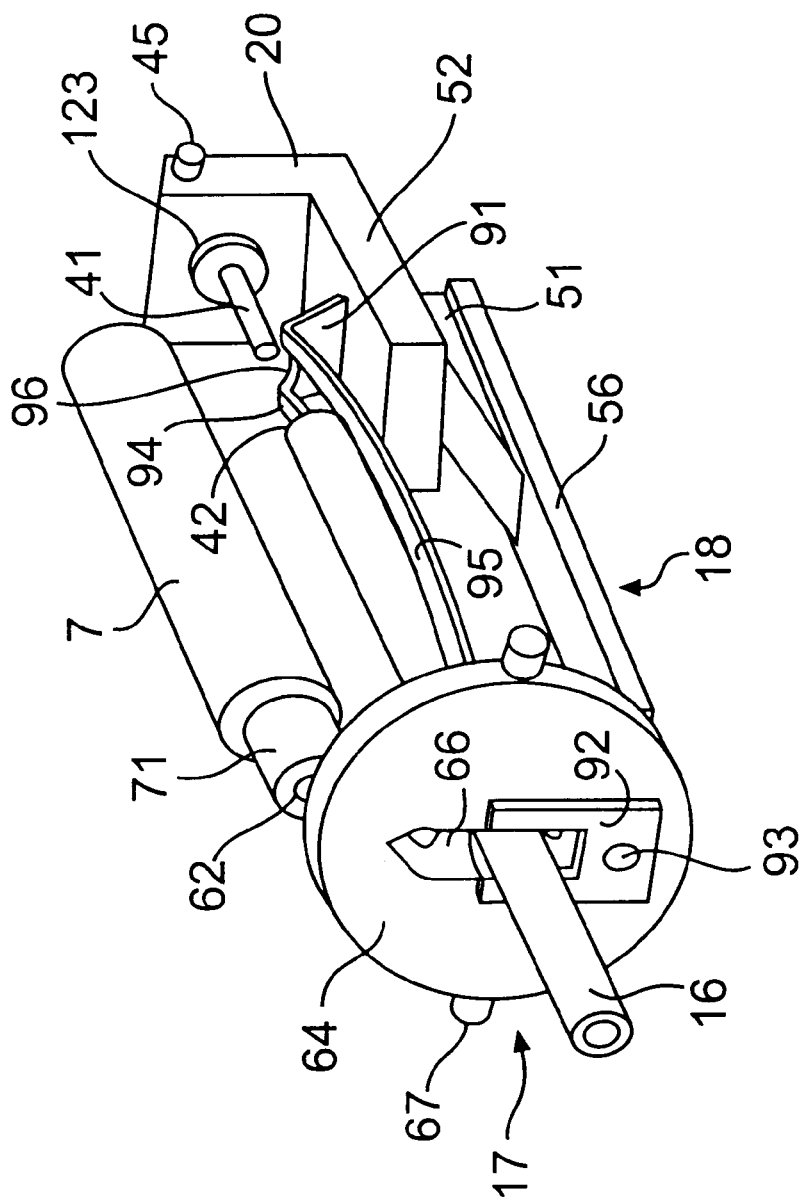
FIG. 8 is a diagrammatic pictorial representation of certain of the components of the region of the device shown in sectional view in FIG. 7, i.e. in the ignition disposition of the switch.

The configuration and mounting of the extinction spring will be seen most clearly from the pictorial representation of FIG. 8, which shows the spring in its ignition disposition. The spring 19 consists of a generally elongate, tonguelike structure, having a laterally extending flange or plate portion 91, 92 at each end, flange 91 defining the extinguishing tip portion of the spring, this essentially consisting of a solid sideways extending plate portion for effecting the required break in gas flow desired to kill the flame at the appropriate stage of unit start-up. The spring is mounted on the rocker switch 17 by means of a rivet 93 passing through the spring end flange portion 92, to hold the flange 92 against the substantially planar forward or tip-end face 64 of the rocker. The elongate tongue portion of the spring is split axially to provide a tongue portion 94, 95 to each side of the Venturi tube 16. A longitudinally-slotted structure spring 19 is thus provided, which straddles the Venturi and passes over the Venturi during movement between its ignition and gas-on dispositions. At the extinction tip end, the flange or tip 91 bridges across between the strip portions 94, 95 at this laterally-located free end portion of spring 19, and also has a scalloped or dipped portion 96 on the upper edge of the flange, between the laterally-extending end portions of the strips 94, 95 at this location, to provide for passage of flowing gas in a deflected ignition configuration of the spring, to be described.

At the rocker end, the initial portions of the strips 94, 95 pass for a short distance through a Vee-shaped notch 65 extending in diverging manner from the planar front face 64 of the rocker 17 through an enlarged, rearwardly-oriented, generally dome-shaped, boss portion 66 of the rocker. The upper face of this Vee-shaped notch 65 applies a constraining force to the strips 94, 95 of the tongue of the spring when the rocker is urged towards and into its ignition disposition, so that the tip 91 of the spring presses against the heel 52 of valve operating lever 20 to maintain it in close engagement with the camming portion 51 of the switch 18, and the spring 19 is curved or flexed along its length into the configuration shown in FIGS. 7 and 8. When the rocker is in its other end disposition, which is its non-active or gas-flow (gas-on) disposition, the other lower face of the Vee-shaped notch 65 urges the spring 19 into an oppositely curved configuration to take up an oppositely stressed configuration, in which the tip 91 is located to the opposite side of the gas tube or nozzle 41 from the limb 52 of lever 20, this being the arrangement shown in the "off" disposition of FIG. 4 and the "gas-on" disposition of FIG. 5. Passage of the tip 91 through the gas flow during the change of condition of the spring from its ignition disposition to its configuration in the inactive non-ignition or gas-on orientation of the rocker effects the extinguishing action already adverted to, in a manner now further explained having regard to FIGS. 5 to 7, in addition to FIGS. 4 and 8.

FIG. 4 shows the device of the invention in an "off" condition, with the switch 18 in its rearmost disposition, so that camming portion 51 allows spring 20 to be biassed by its own spring (not shown in this drawing, see FIGS. 9 and 10) into its gas valve closed orientation. The piezo device is also in an expanded condition, so that rocker 17 is in its most anti-clockwise pivoted disposition and the tip of spring 19 is located above nozzle tube 41 and clear of the gas flow path.

Figure 5:
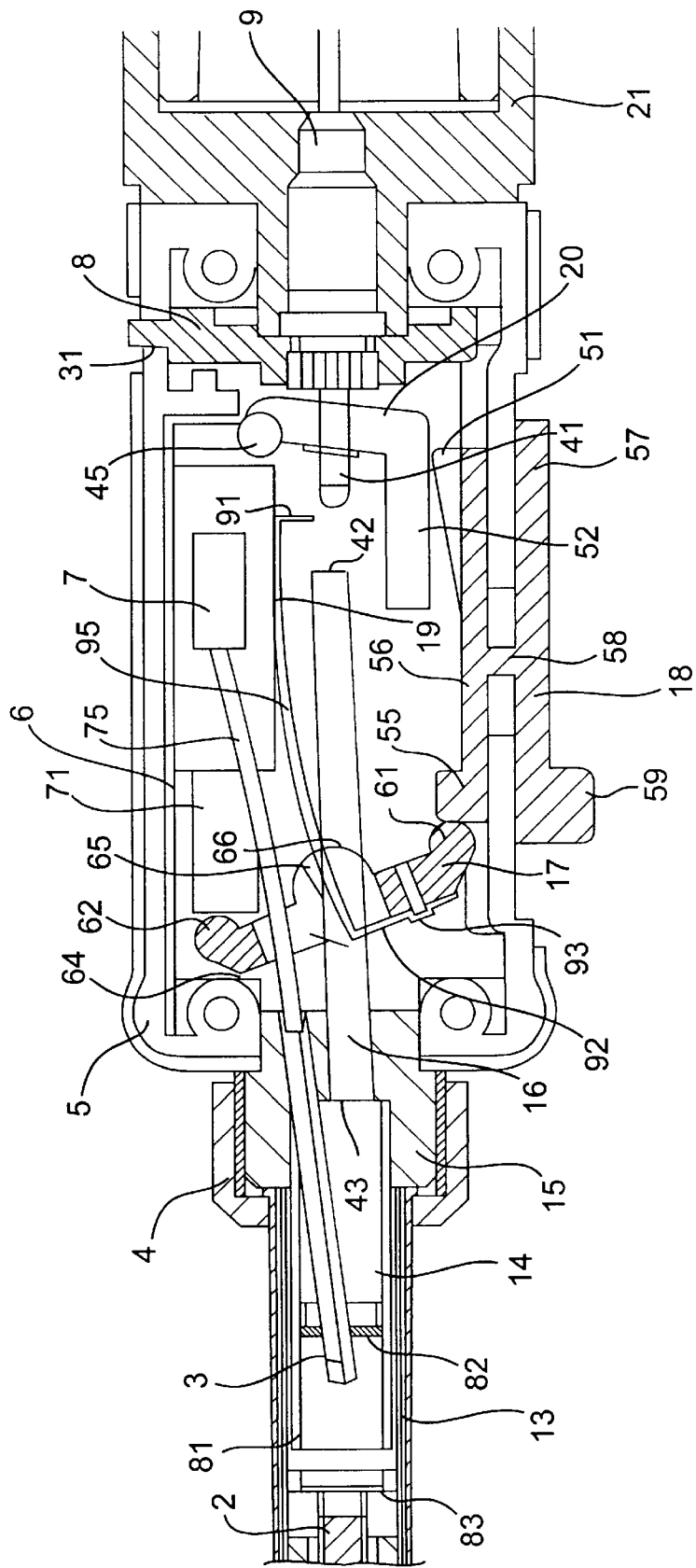

To start up the unit, the switch 18 is pushed forward into a gas flow or gas-on disposition as shown in FIG. 5. At this stage, camming portion 51 has caused lever 20 to pivot forwardly and open the gas valve for flow of gas through the nozzle and Venturi to the combustion chamber, but ignition has not yet taken place. Switch lug portion 55 is about to come in contact with rocker lug 61, but ignition action has not yet been initiated. Thus while gas flow has been triggered, no rotational movement of rocket 17 has yet been effected. Spring 19 remains in the same configuration as that of FIG. 4, in which tip 91 is out of the gas flow.

Figure 6:
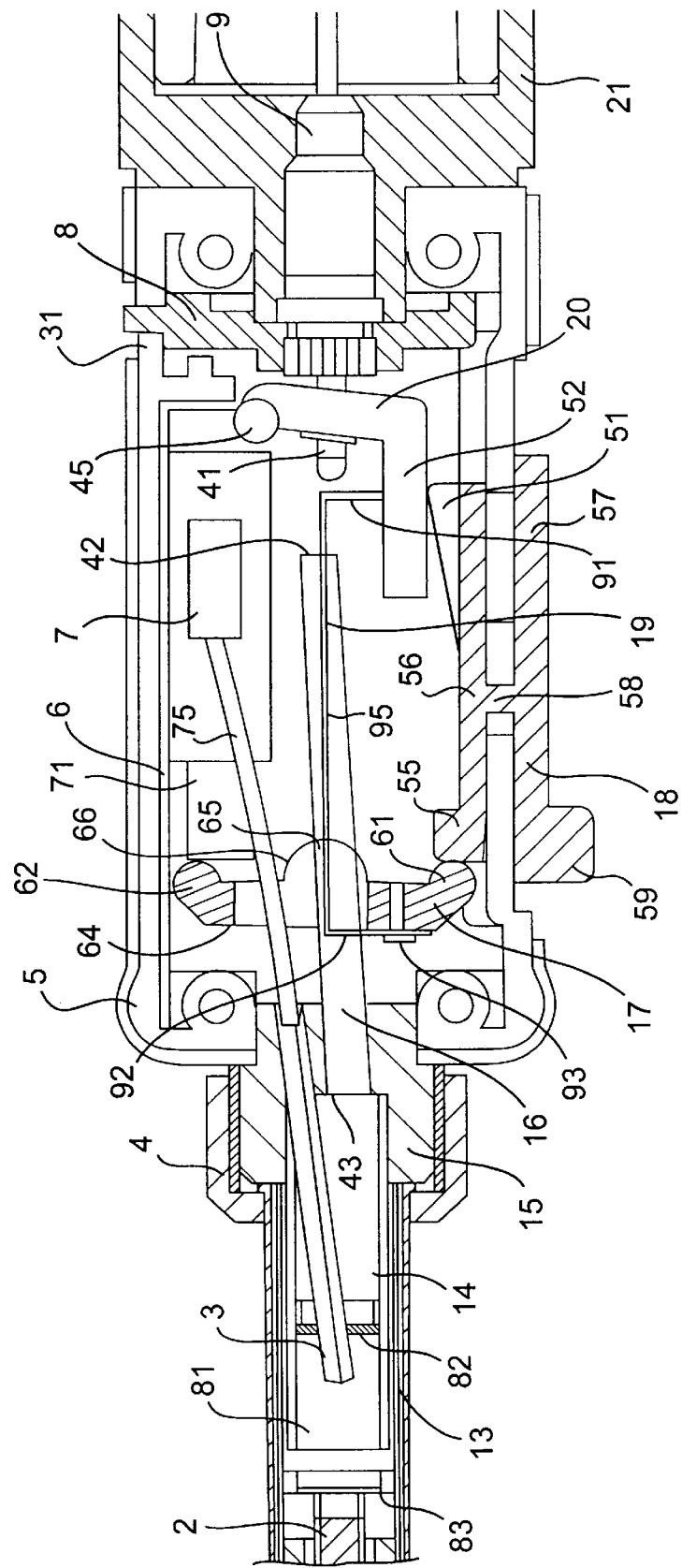

Further forward movement of switch 18 brings the various components into the configuration shown in FIG. 6, which is the disposition of the device immediately prior to ignition. This configuration may also be referred to as a "mid" position of the unit. Lug 55 of switch 18 has engaged lug 61 of rocker 17 to initiate pivoting movement of the rocker in a clockwise direction and cause lug 62 to start to depress piezo movable element 71. Spring 19 has been pivoted downwardly and tip 91 is crossing over through the flowing gas to engage limb 52 of lever 20. This traversing of the gas stream during transformation of the spring from its non-active or gas-on condition into its ignition configuration has, however, no effect on the operation of the device, other than an instantaneous break or blip in the release of gas, since at this stage of start-up, the gas has not yet been ignited.

Figure 7:
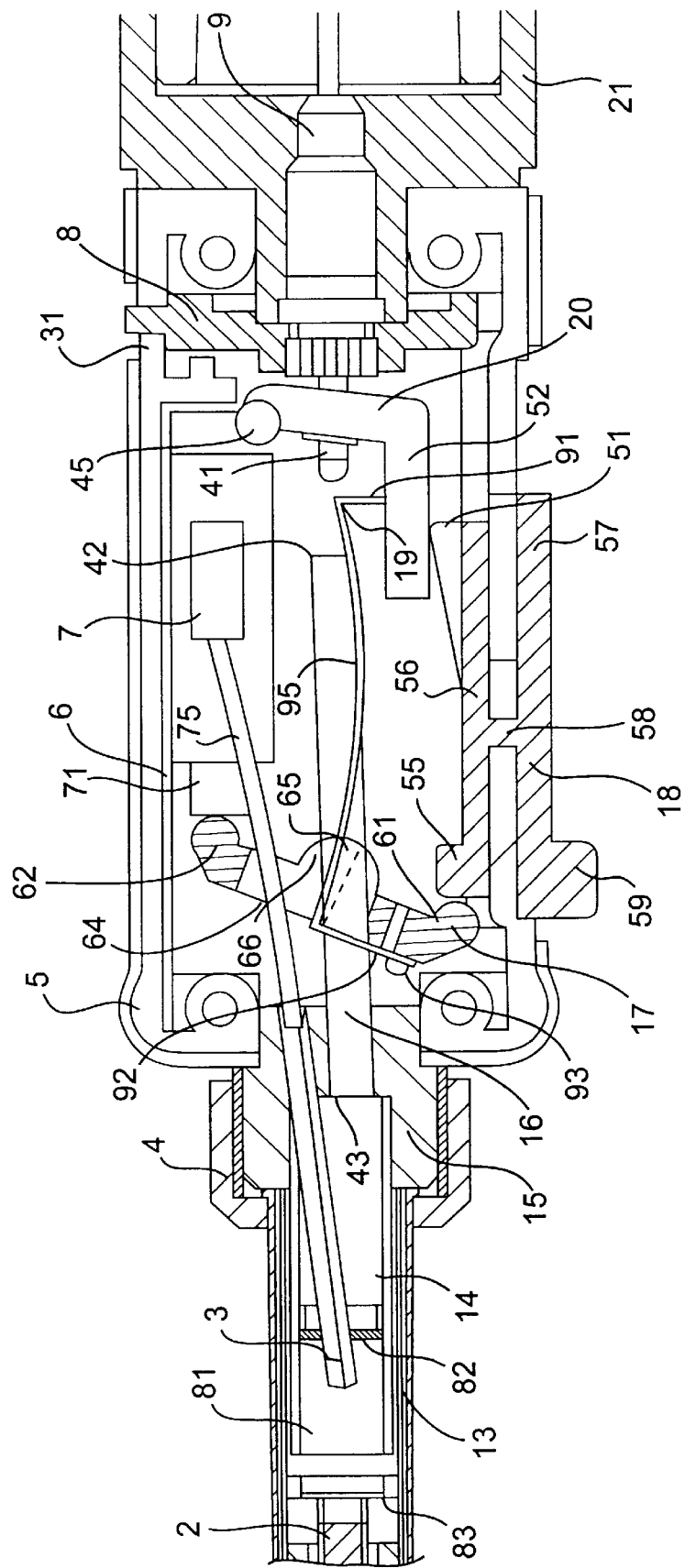

The preferred procedure is for gas flow to be allowed to continue without ignition for a short initial period, and to then move the switch forward into the ignition position shown in FIG. 7 and pictorially in FIG. 8. Action of the piezo-electric device then generates a spark, which causes the gas to ignite in the combustion chamber. The upper face of Vee-notch 65 causes spring 19 to take up the curved disposition of FIGS. 7 and 8, with tip 91 pressing down on heel 52 of lever 20, as previously described. The switch is held in the forward or ignition disposition for a further brief period, typically about one second, to allow combustion to continue for a short time, and then slid back again into the gas flow disposition of FIG. 5. This reverse movement is aided by the spring within the piezo device. During the period while combustion prevails, gas flow from the nozzle tube 41 to the Venturi passes through the cut-out or recessed central portion 96 of the upper edge of the tip flange 91, in uninterrupted manner.

However, as the reverse movement of the switch back to the gas flow condition takes place, the transversely mounted rocker switch 17, comprising a disc supported transversely within the head end structure 5 of the device, is rotated in a clockwise direction, so that the tail spring 19 attached to it flicks back across the face of the nozzle tube 41. This return displacement of the rocker 17 is engendered by the combined effects of the piezo return spring and the flexed extinction spring 19 so that spring 19 passes speedily across the front of the nozzle. The end 91 of the spring 19 in the vicinity of the nozzle tube 41 cuts off the flow of gas momentarily as it moves through the gas stream in this reverse displacement. The flow of gas is therefore briefly interrupted, so that the supply of gas to the combustion chamber is broken for a short period and the flame in the combustion chamber is extinguished. The initial burst of flame typically heats the catalyst up to approximately 100° to 150° Centigrade, and when gas flow is restored, as further movement of spring 19 again clears the end of the nozzle 41 for outflow of gas, a heat-generating reaction is now initiated in the catalyst and continues by direct impingement of gas onto the catalyst material, without combustion or flame heating. Thus continuous heat generation proceeds, and the catalyst heats up to some 400° Centigrade, but without the presence of a flame. A diversity of suitable catalyst materials may be employed. Typically a metallic catalyst material is used.

The tail spring 19 on the rocker plate 17 serves not only to interrupt the flow of gas, but in the ignition position of FIG. 7, the free end 91 of this spring also holds the lever arm 20 in the gas flow position. The deformation of the spring 19 also assists in holding the rocker disc 17 itself in the ignition or piezo-electric device activating configuration of the rocker. During subsequent use of the tool, following flame extinction, the unit remains in the "gas-on" disposition of FIG. 5.

Figure 9:
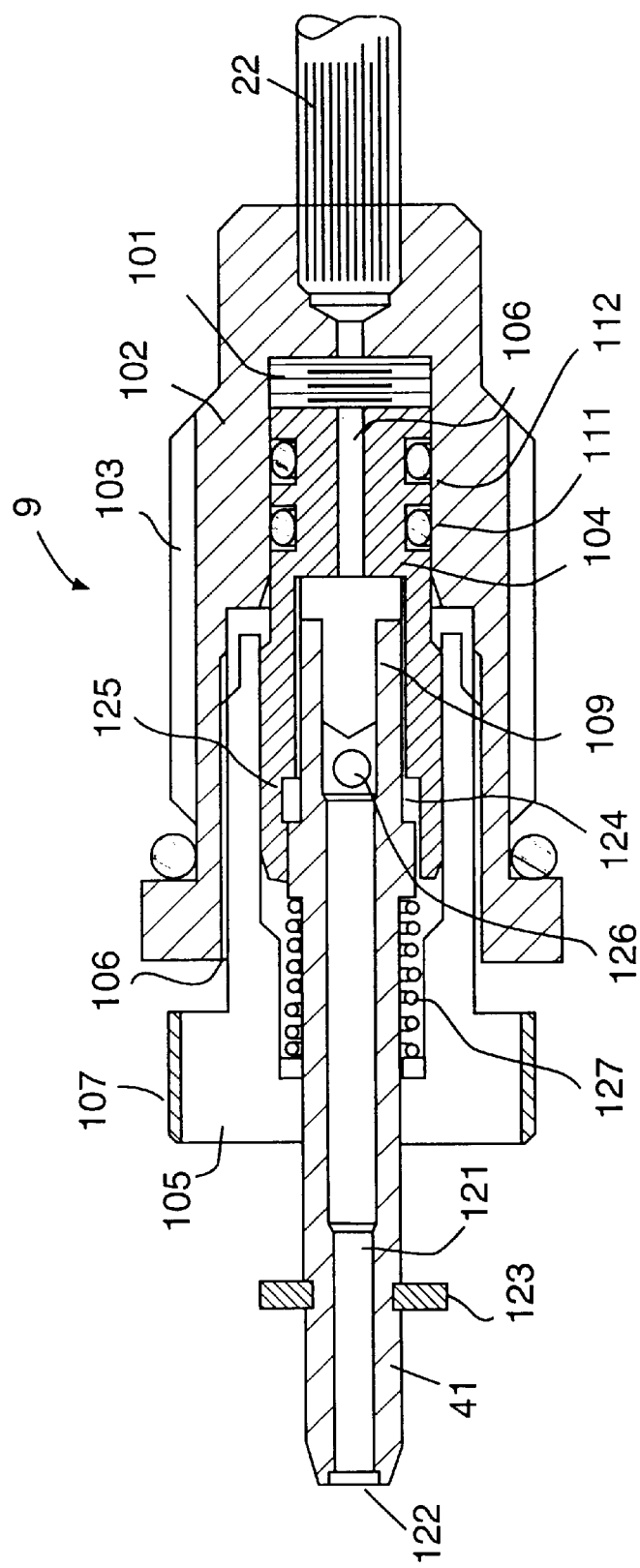
FIG. 9 is a sectional view of the fuel flow control arrangements identified as a general feature in FIG. 2.
Figure 10:
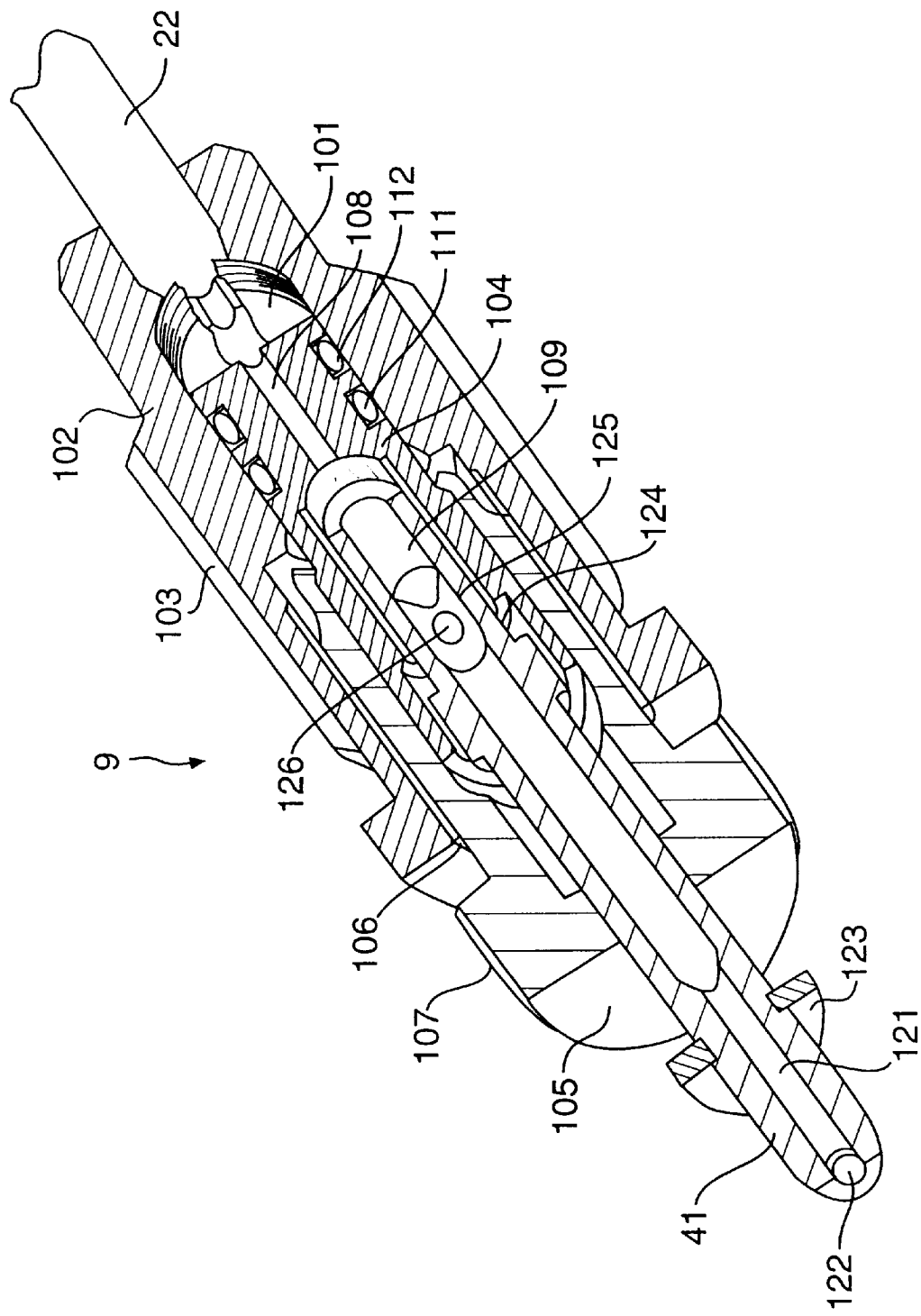
FIG. 10 is a pictorial representation of the fuel flow control valve portion of the soldering tool of the invention, in further illustration of the sectional view of FIG. 9.

There remains now to describe the gas flow assembly 9, housed within the aluminium housing portion 21. Referring to FIGS. 9 and 10, gas drawn forward from the tank 10 by the wick 22 accumulates on a number of sponge type layers or structures 101 accommodated within an axial bore in an adjuster bush 102 of the valve assembly 9, for evaporation and subsequent onward feed in the gaseous phase to the combustion chamber and catalyst assembly when released by operation of the valve assembly. This adjuster bush 102 is screwed 103 into the aluminium adjuster housing 9. An axially movable structure 104, termed a stem bush, is displaceable within the internal axial bore of the adjuster bush 102 and has a maximum axial movement of the order of approximately 0.1 of a millimeter to compress and release the sponges 101 in the compression region or bore of bush 102. The stem bush 104 is sealed against gas flow along its external periphery, where it is slidingly engaged within the adjuster bush 102, by suitable O-ring seals 111 received in annular grooves 112 extending around the periphery of the stem bush. Axial displacement of this stem bush 104 is achieved by rotary movement of the adjuster member 8 of the unit, and serves to regulate the flow of gas from the tank 10 by varying the degree of compression and decompression of the sponges 101 on a fully adjustable basis between the limits of rotation, typically 1100 sectoral displacement of adjuster 8, this in turn governing axial travel.

The stem bush 104 is received as a force fit within an adjuster member 105 of the structure, to which it is also crimped, following assembly, as shown in FIG. 10. Adjuster 105 is mounted in screwthread manner 106 within the adjuster bush 102. Adjuster member 105 is gripped around its external periphery 107, which is suitably serrated or likewise treated, by a sectorally displaceable portion of the adjuster assembly 8 terminating in the finger-engageable portion which extends through the the slot 31 in the casing 5. Thus rotation of the adjuster portion 8 results in axial displacement of member 105, by virtue of its screwthread engagement 106 in the adjuster bush 102, and consequently also effects axial displacement of the stem bush 104 secured to member 105 to in turn bring about the variable compression of the gas-absorbent sponges 101. Thus rotation of the adjuster 105 is effected by the rotary member 8 of the assembly, which engages with the adjuster 105 by means of the splines or serrations 107 and has a portion projecting or protruding to the exterior of the device, for engagement by the hand in use of the invention. The rotation of the adjuster 105 by the hand-engageable protruding portion 8 suitably extends through 110°, to give the required axial displacement of the stem bush 104 and therefore the required variation in the degree of compression of the sponges 101.

Gas evaporating from the sponges passes through a central passage 108 of the stem bush 104 and is blocked at the exit end of this central passage 108 in a closed condition of the device by a plug 109, which defines a valve member for release of gas. Axial displacement of this plug 109 for release of gas is effected by a spring-loaded nozzle arrangement, now further described.

The nozzle structure comprises an elongate axial shaft which defines the nozzle tube 41 and has a hollow interior 121 extending axially from the closure plug 109 along and within the stem bush 104 to terminate axially outwardly of the bush 104 at a jewel type exit nozzle 122, typically of sapphire, with a central bore of 62 to 65 microns diameter. The sapphire 122 provides extreme precision of bore or aperture in that laser drilling can be used to achieve close control on the diameter of the nozzle, as compared with the drilling of a metal material such as stainless steel, where the periphery of a nozzle hole may be less well defined. Displacement of the sealing plug 109 away from the exit end of the bore 108 of the stem bush 104 is achieved by pulling the elongate member 41 of the nozzle structure forwards by means of the lever arm 20, which engages under or behind a collar 123 engaged in a peripheral groove of the elongate nozzle portion 41. When the sealing plug 109 is moved forwardly by forward pivoting of lever 20, as already described, gas percolates down the wall 124 of the axial nozzle tube, through a peripheral or annular gap external of the plug end of the nozzle tube 41 and defined on the outer side by the inner periphery 125 of a portion of the stem bush 104. The gas then passes into the axial central bore 121 of the elongate nozzle member 41 by means of transverse bores 126 extending radially through the wall of the nozzle tube 41 in the vicinity of its inner or plug valve end.

The nozzle tube is biassed towards a valve or plug closed condition, with no gas flow, by a coil spring 127, effective between annular steps or flange portions on the adjuster 105 and nozzle tube 41 respectively. Thus the nozzle tube travels with the adjuster during axial displacement of the adjuster member and stem bush, but is itself independently displaceable relative to the adjuster and stem bush to open and close the plug 109 for gas flow. As previously noted therefore, gas flow is controlled by opening and closing valve 109, but the actual quantity of gas flowing is then regulated by adjustment of the degree of compression of the sponges 101. In addition to urging the valve plug 109 towards its closed disposition, the spring 127 is also effective to urge lever 20 towards its anti-clockwise or valve closed orientation.

Figure 11:
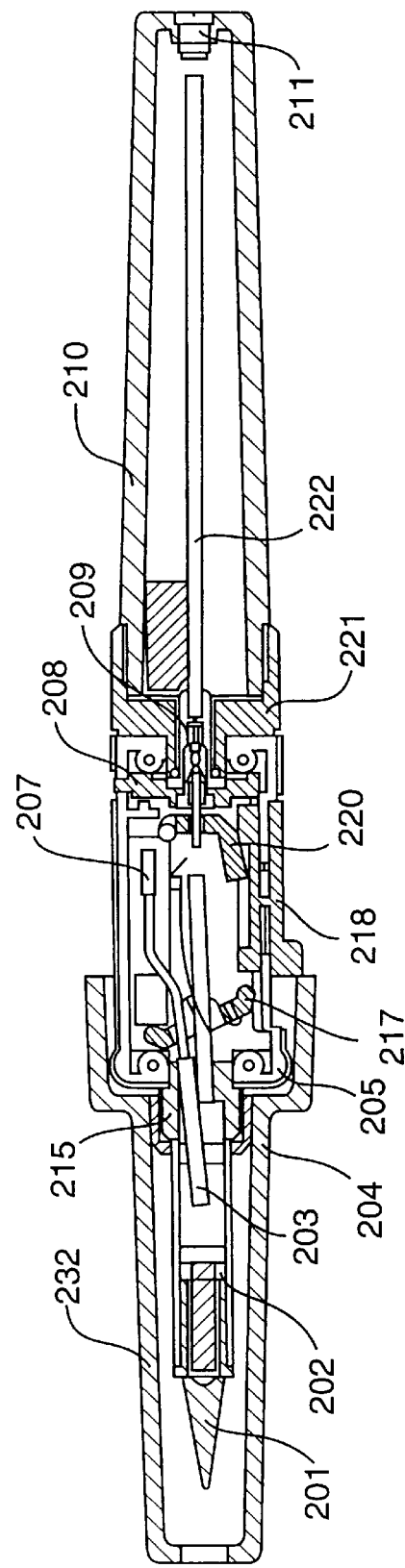
FIG. 11 is a longitudinal cross-section of the tool of the invention in a second embodiment.
Figure 12:
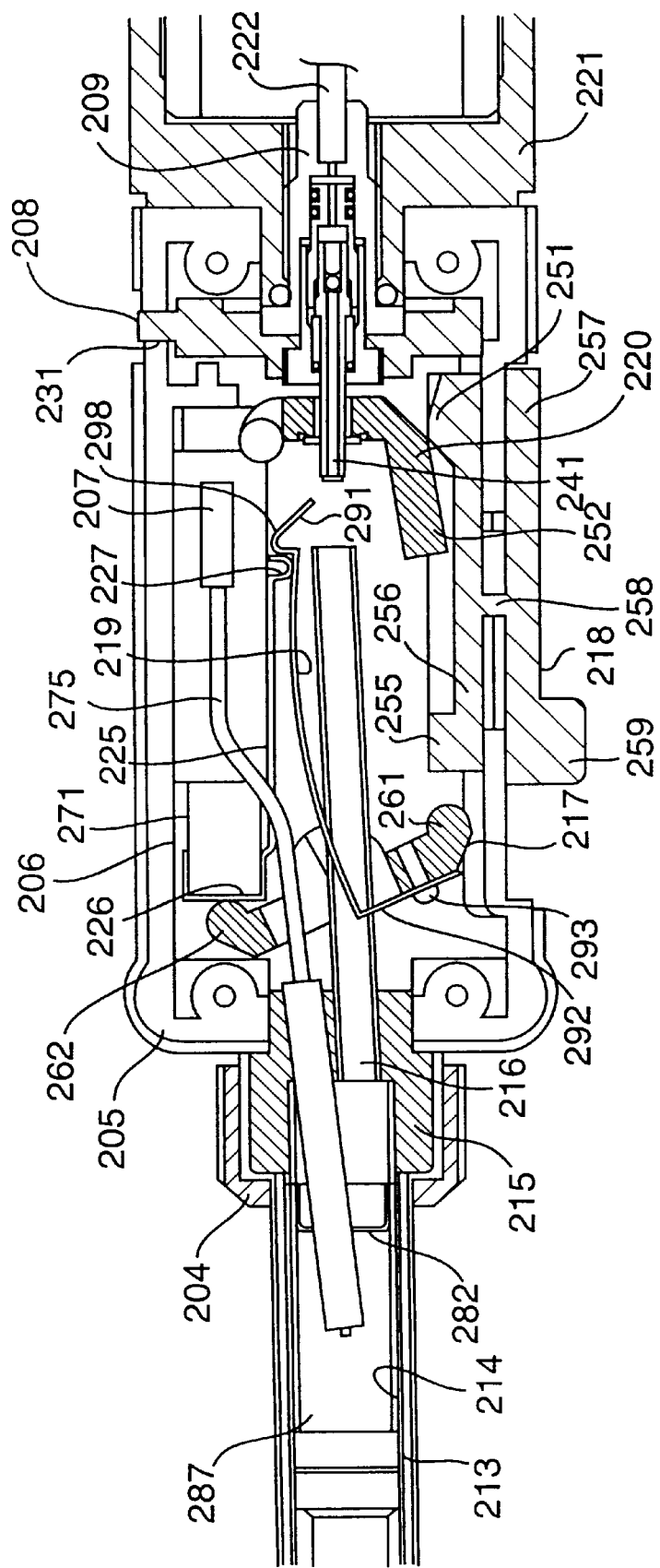
FIG. 12 is a longitudinal cross-sectional enlargement of the gas flow and ignition switch region of the device of FIG. 11, in the inactive or "off" disposition of the switch, FIG. 13 corresponds to FIG. 12, but with the operating witch in the "gas-on" position, prior to ignition, to which the switch also reverts subsequent to ignition, FIG. 14 again corresponds to FIG. 12, but in this instance with the operating switch in a so-called "mid" disposition, which it occupies immediately before ignition, at the commencement of igniting displacement of the switch, FIG. 15 again corresponds to FIG. 12, but in this instance showing the switch in its ignition disposition.

FIGS. 11 to 16 inclusive relate to a further embodiment of the invention, largely similar to that of FIGS. 1 to 10, but incorporating a number of design refinements, in addition to a modification of the flame extinction arrangement. FIG. 11 is a longitudinal sectional view of the invention in this embodiment, corresponding to the longitudinal section of FIG. 2, similar components in FIG. 11 to those of FIG. 2 having the same reference numerals as those of FIG. 2, but with the addition of 200. All of the components identified or designated in FIG. 11 correspond to those already discussed in regard to FIGS. 1 and 2, and no further detailed discussion is now required. FIGS. 12 to 15 inclusive correspond to FIGS. 4 to 7 inclusive, in showing successive stages of operation of the device of the invention, when undertaking an ignition operation. FIG. 12 shows an off position, FIG. 13 an "on" or "gas-on" position, FIG. 14 a so-called "mid" position, and FIG. 15 the ignition position. Again, all of the features shown in these drawings equate to those of FIGS. 4 to 7 and FIG. 8 with the addition of 200 to the original reference numerals. This second embodiment contains however the following additional features and modifications now discussed. The flame extinction tip 291 of the flame-out or extinction spring 219 has a different profile or configuration from the arrangement shown in FIGS. 4 to 8. In place of the generally transverse tip of FIG. 4 et al, the tip 291 extends obliquely relative to the longitudinal axis of the device and is connected to the tongue portions of the spring 219 by a curved or camming portion 298, defining a part circular profile in side view of the spring member in this region, the outer curve of the part circular portion or camming portion 298 being directed radially outward of the unit relative to its central longitudinal axis. This camming portion of tip 291 cooperates in use with an active end 227 of a flame spring retarding member 225, which is mounted on the displaceable or moving part 271 of the piezoelectric device by means of a mounting end 226. Member 225 is thus formed by appropriately bending a piece of strip material so as to define a clip at end 226, which can be snapped over the sliding part 271 of the piezo device in a straightforward assembly operation for engagement in use by lug portion 262 of rocker 217. The mounting end or clip portion 226 is thus interposed between lug 262 and the end of part 271 against which the lug engages.

The active end 227 is curved in a generally matching manner to the camming portion 298 of spring member 291, so as to define a part circular portion. The convex surface of the part circular portion 227 is however in this instance directed radially inward with respect to the longitudinal axes of the tool, so that during axial displacement of member 225, which travels with part 271 during displacement or activation of the piezo device, active end 227 comes into camming engagement with camming portion 298 of tip 291 when certain positional relationships prevail between the member 225 and the spring 219.

Figure 13:
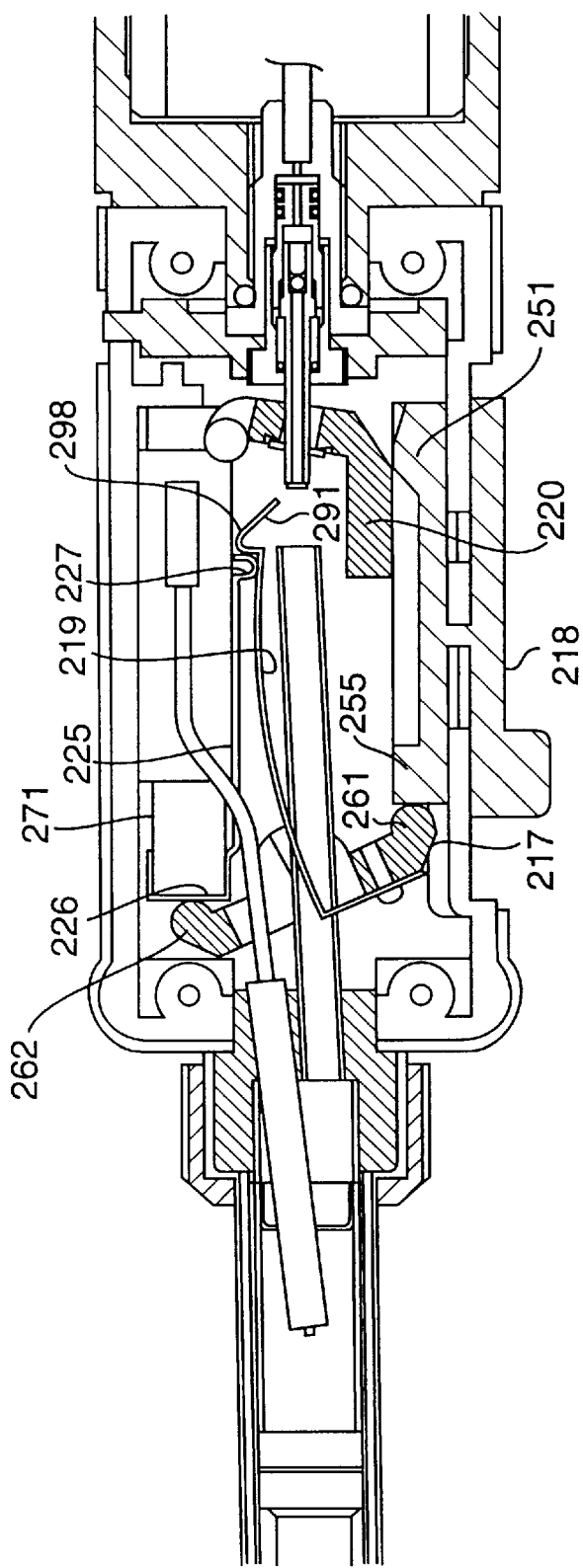
Figure 14:
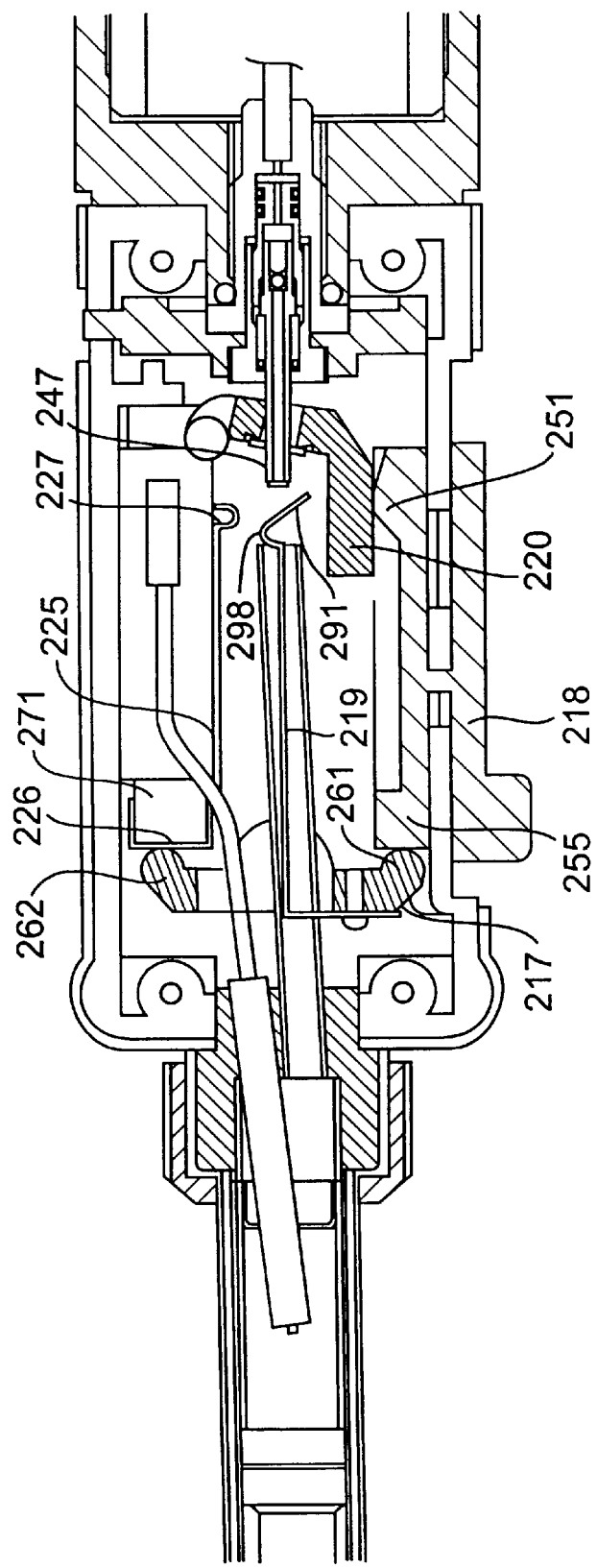

In the off position of FIG. 12 and also in the initial or on position of FIG. 13, spring 219 is deformed into its outer-most or first stressed disposition, substantially equivalent to that of FIGS. 4 and 5, with active end 227 of flame spring retarding member 225 then engaging the free end region of the tongue parts of member 219 axially inward of the camming portion 298 of tip 291. When piezo part 271 is depressed by the action of the rocker 217, as shown in FIG. 14, active end 227 moves forwardly, but at the same time, spring 219 is traversed across through the gas flow path to take up its oppositely curved or second stressed disposition in the ignition configuration of FIG. 15. The purpose of the cooperating camming portion 298 and active end 227 is to delay the passage of the tip 291 through the gas stream or jet exiting from the nozzle tube 241 during reverse movement of the spring 219 from its second or active disposition in the ignition configuration of FIG. 15 back into the configuration which it occupies in the gas on disposition of FIG. 12. The relationship between the two members is such that during this reverse movement, spring 219 reverses its deflection and snaps over to traverse tip 291 through the gas stream at a moment when the axial location of member 225 is such that the camming portion 229 of tip 291 on its outer convex region strikes against the inwardly directed likewise convex region of active end 227. As active end 227 moves axially past camming portion 298 of tip 291, during the reverse movement of piezo part 271 back into the expanded configuration of the piezo device, active end 227 serves to hold tip 291 within the jet of gas for a slightly longer period than applies in the construction of FIG. 4 et al, where there is no obstruction in the return path of the spring tip 91. This retarding action of active end 227 of member 225 leads to greater reliability in flame extinction by holding the tip 291 within the gas path for a slightly longer period than applies in the case of the first embodiment, this holding period nonetheless still representing substantially momentary mechanical interruption of the gas flow or jet exiting from the nozzle in a region immediately adjacent to the nozzle but slightly downstream from it. Enhanced reliability in flame extinction is therefore achieved by this adaptation or variant of the invention, which is thus especially proof against user abuse or incorrect user operation.

Figure 16:
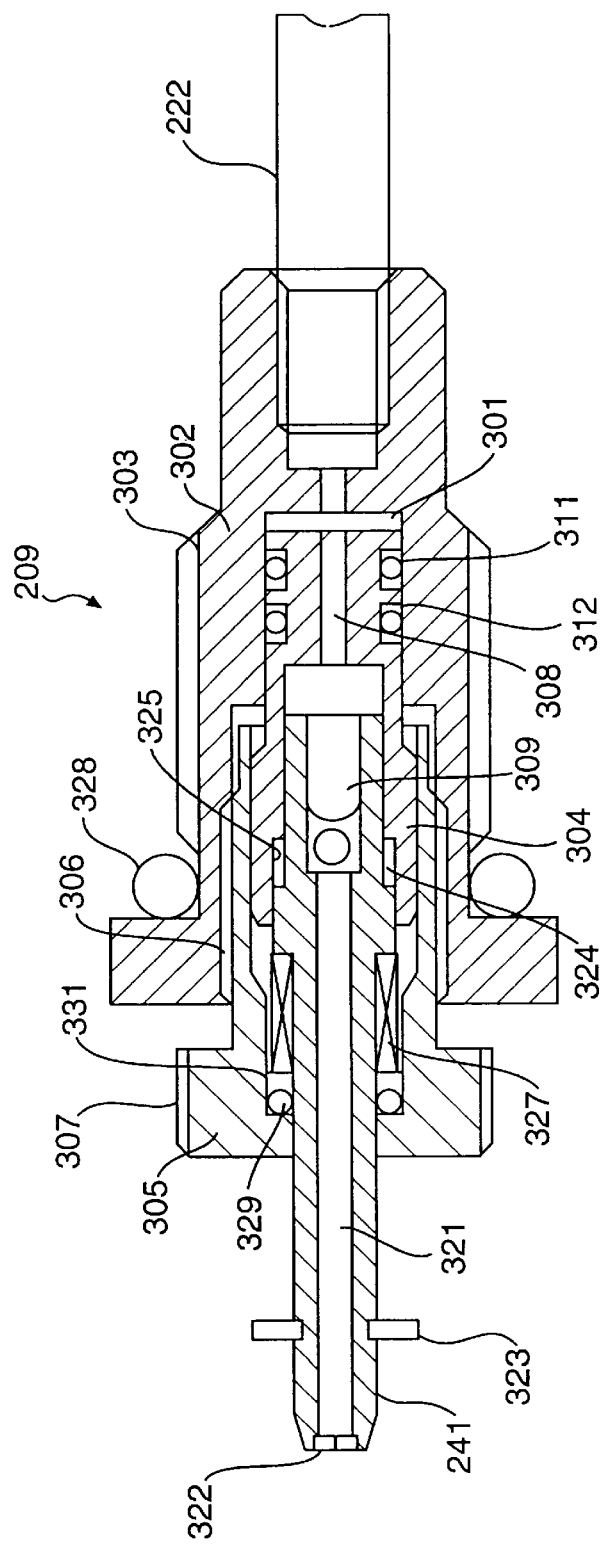
FIG. 16 is a sectional view of the fuel flow control arrangements identified as a general feature in the representation of the second embodiment of the invention shown in FIG. 11.

Referring now to FIG. 16, there is depicted a further representation of the fuel valve assembly of FIGS. 9 and 10, in which the various items are identified by the same reference numerals as those of these previous Figures, but with the addition of 200 or 300 as appropriate. Thus the sponge layers occupy the region 301 and reference 309 designates a shut-off pad or plug, as also shown in FIGS. 9 and 10. Reference 323 designates a circlip or like collar arrangement, while additional references 328, 329 and 331 designate O-rings and washers not specifically identified in FIGS. 9 and 10. All of the features of this drawing equate to those of the Figures previously discussed.

Particular advantages of the invention are the reliable method of securing extinction of flame. The extinction spring arrangement of the present invention is especially effective in achieving flame extinction. It also facilitates an optimised gas flow control arrangement enabling efficient use of gas with minimum waste. Any failure of the catalyst to heat following extinction indicates that the catalyst is starting to be consumed and requires replacement. A further especially advantageous feature of the invention is the provision of the aluminium support structure for the transition portion between the tank and the remainder of the invention. This means that there is warming of the evaporation region and chamber of the device simply by holding it in the hand. Despite the greater cost of using aluminium for this portion of the structure, the technical advantage gained is considerable. Thus the unit of the invention can be rapidly brought to a state of readiness for use by hand-heat only, even if it has become chilled during storage or a period of non-use. A further especial advantage of the assembly structure described is that it is put together by screwing components into one another and no welding is involved, while the manner of mounting the flame extinction components further facilitates manufacturing assembly. Finally, a further particular feature of the invention is the use of a separable tip and element, as compared with certain known constructions.

I claim:

1. A handheld heat-generating tool comprising:

a fuel reservoir;

a heat evolution and application section having a forward region for application of heat generated by the tool, a rearward region within which heat generation takes place by means of fuel interaction with a catalytic element, and a combustion region to the rear of the catalytic element for initial flame heating of the catalytic element;

valve means for controlling flow of fuel from the fuel reservoir to the heat evolution and application section;

a nozzle for release of a stream of gas provided by said valve means, for flow of said stream of gas to said combustion region of the heat evolution and application section of the tool;

means for igniting fuel in said combustion region for said initial flame heating of the catalytic element;

means for termination of the initial flame heating in said combustion region by substantially momentary interruption of the flow of fuel from the fuel reservoir to the heat evolution and application section, wherein said means for termination of the initial flame heating comprises a flame extinction member arranged to traverse said stream of gas released from said nozzle immediately adjacent to said nozzle in said region downstream from the nozzle, and said means is located for substantially momentary mechanical interruption of said stream of gas released from said nozzle in a region downstream from the nozzle; and a manually operable switch member displacable between at least two positions, wherein said traverse of said stream of gas by said flame extinction member is effected by displacement of said switch member between said at least two positions.

2. A handheld heat-generating tool according to claim 1, comprising a duct [(16; 216)] for flow of said stream of gas released from said nozzle to said combustion region [(81; 281)] of the heat evolution and application section [(1, 12; 201, 212)] of the tool, the entry [(42; 242)] to the duct [(16; 216)] being separated from the nozzle [(16; 216)] by said region [(41 to 42; 241 to 242)] downstream from the nozzle.

Figure 15:
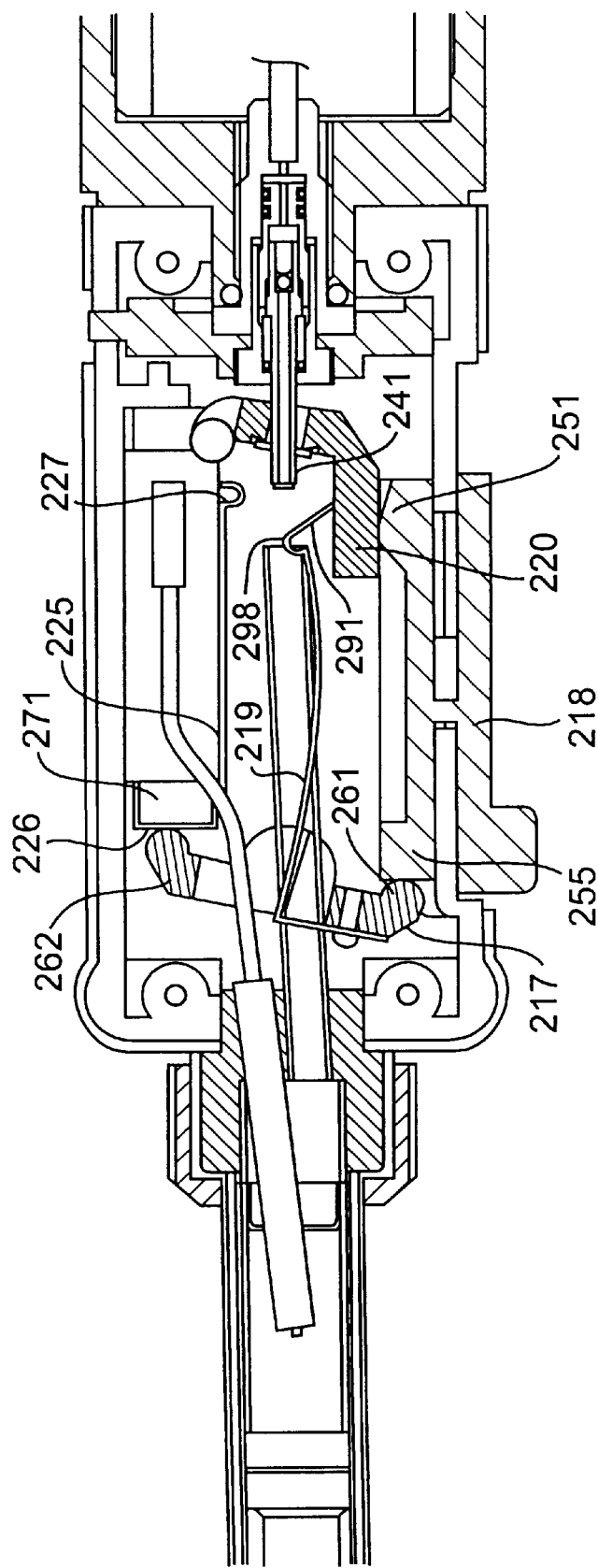

3. A handheld heat-generating tool according to claim 1, wherein said flame extinction member [(91; 291)] is defined by a free end region [(91; 291)] of a resilient spring portion [(19; 219)] mounted for displacement between a first stressed configuration [(FIGS. 4, 5; FIGS. 12, 13)] and a second stressed configuration [(FIG. 7; FIG. 15)] by displacement of said switch member [(18; 218)] between said at least two positions [(FIGS. 4, 7; FIGS. 12, 15)], said traverse [(FIG. 14)] of said stream of gas by said flame extinction member [(91; 291)] being effected by displacement of said resilient spring portion [(19; 219)] from said second [(FIG. 7; FIG. 15)] to said first [(FIGS. 4, 5; FIGS. 12, 13)] stressed configuration.

4. A handheld heat-generating tool according to claim 3, comprising a switch housing portion [(5; 205)], said switch member being slidably mounted in said switch housing portion [(5; 205)] and cooperating with a rocker member [(17; 217)] pivotably mounted within the switch housing portion [(5; 205)] for activation of a piezo-electric device [(7; 207)], pivoting movement of the rocker member [(17; 217)]] being effected by sliding displacement of said switch member [(18; 218)], wherein said resilient spring portion [(19; 219)] is mounted on the rocker member [(17; 217)] and said displacement of said resilient spring portion [(19; 219)] between said first [(FIGS. 4, 5; FIGS. 12, 13)] and second [(FIG. 7; FIG. 15)] stressed configurations is effected by said pivoting movement of said rocker member [(17; 217)].

5. A handheld heat-generating tool according to claim 4, wherein said switch member [(17; 217)] is displaceably between an off position [(FIG. 4; FIG. 12)] and an ignition position [(FIG. 7; FIG. 15)] through an intermediate fuel-flow position [(FIG. 5; FIG. 13)], and said traverse of said stream of gas by the flame extinction member [(91; 291)] is effected during displacement of the switch member [(17; 217)] from the ignition position [(FIG. 7; FIG. 15)] to the fuel-flow position [(FIG. 5; FIG. 13)].

6. A handheld heat-generating tool according to claim 5, comprising a retarding member [(225)] mounted on a moving part [(271)] of the piezo-electric device [(207)] and having an end [(227)] for engagement with a portion [(298)] of the flame extinction member [(291)] during said traverse of said stream of gas by the flame extinction member [(291)] from said second [(FIG. 15)] to said first [(FIGS. 12, 13)] stressed configuration of said resilient spring portion [(219)] during reverse movement of said part [(271)] into an expanded configuration of the piezo-electric device [(207)], to hold said flame extinction member [(291)] within said stream of gas for a period representing said substantially momentary mechanical interruption of the flow of said stream of gas.

7. A handheld heat-generating tool according to claim 1, wherein the valve means [(9; 209)] for controlling flow of fuel from the fuel reservoir [(10; 210)] to the heat evolution and application section [(1, 12; 201, 212)] comprises a valve assembly [(9; 209)], and said valve assembly [(9; 209)] is accommodated within a valve housing structure [(21; 221)] formed from a heat conductive material to assist evaporation of fuel by means of hand heat originating from a user of the tool by holding the tool in the hand.

8. A handheld heat-generating tool according to claim 7 wherein said valve housing structure [(21; 221)] has an external hand-engageable surface.

9. A handheld heat-generating tool according to claim 7, wherein the valve assembly comprises a flow control member [(109; 309)] displaceable between a closed position and an open position, and the valve assembly [(9, 209)] further comprises a flow regulation feature [(101, 105, 107; 301, 305, 307)] for varying the rate of release of fuel from the reservoir [(10, 210)] when the flow control member [(109; 309)] is open.

10. A handheld heat-generating tool according to claim 9, wherein the flow regulation feature [(101, 105, 107; 301, 305, 307)] comprises a compressible fuel-permeable assembly [(101; 301)] accommodated within the valve housing structure [(21; 221)] and manually operable adjustment means [(105, 107; 305, 307)] for varying the degree of compression of the fuel-permeable assembly [(101; 301)].

11. A handheld heat-generating tool according to claim 10, wherein the fuel-permeable assembly [(101; 301)] comprises a spongiform arrangement [(101; 301)] and the adjustment means comprises a sectorally displaceably manually-engageable member [(105; 305)] linked to a screw-thread type structure [(106; 306)] for translating rotational displacement of the manually-engageable member [(105; 305)] into axial [(104; 304)] compressive action on the spongiform arrangement [(101; 301)].

12. A handheld heat-generating tool according to claim 11, wherein the valve housing structure [(21; 221)] is formed from aluminum.

13. A handheld heat-generating tool according to claim 7, comprising a switch housing portion [(5, 205)], said valve housing structure [(21; 221)] interconnecting the switch housing portion [(5; 205)] to the fuel reservoir [(10; 210)], wherein the forward region of the heat evolution and application section [(1, 12; 201, 212)] comprises a tip portion [(1; 201)], the tip portion [(1; 201)] being an independent component separable from the remainder of the tool, a first chamber for accommodating the catalytic element [(2; 202)] is defined within a counter-bore region of the tip [(1; 201)] for accommodating a catalyst assembly, to provide an independent interchange or replacement of said catalytic element, and the rearward region of the heat evolution and application section [(1, 112; 201, 212)] within which heat generation takes place by means of fuel interaction with a catalytic element [(2; 202)] comprises a second, flame combustion chamber [(81; 281)] to the rear of said first chamber, said second, flame combustion chamber [(81; 281)] defining said combustion region [(81; 281)], and said tip [(1, 201)], first chamber and second chamber [(81; 281)] being detachably associated with said switch housing portion [(5, 205)].

14. A handheld heat generating tool according to claim 1, wherein a cap [(32; 232)] is provided for occluding the exterior of the heat evolution and application section [(1, 12; 201, 212)], and said cap [(32; 232)] engages a switch member [(18; 218)] of said tool when in its occluding position to maintain the switch member [(18; 218)] in an off position.

15. A handheld heat-generating tool according to claim 1, comprising a switch member [(18; 218)], wherein said switch member [(18; 218)] is shaped to provide an externally-directed flat face to enable the tool to be laid on a flat surface in a stable disposition substantially resistant to inadvertent lateral displacement.

* * * * *